(12) United States Patent
McKibben et al.

(10) Patent No.: US 9,097,037 B2
(45) Date of Patent: Aug. 4, 2015

(54) LOCK DEVICES, SYSTEMS AND METHODS

(71) Applicant: Schlage Lock Company LLC, Indianapolis, IN (US)

(72) Inventors: Aaron P. McKibben, Fishers, IN (US); Kenton Hayes Barker, Colorado Springs, CO (US)

(73) Assignee: Schlage Lock Company LLC, Indianapolis, IN (US)

( * ) Notice: Subject to any disclaimer, the term of this patent is extended or adjusted under 35 U.S.C. 154(b) by 220 days.

(21) Appl. No.: 13/754,668

(22) Filed: Jan. 30, 2013

(65) Prior Publication Data

US 2013/0192317 A1    Aug. 1, 2013

Related U.S. Application Data

(60) Provisional application No. 61/592,358, filed on Jan. 30, 2012.

(51) Int. Cl.
| | |
|---|---|
| *E05B 63/04* | (2006.01) |
| *E05B 47/02* | (2006.01) |
| *E05B 49/00* | (2006.01) |
| *E05B 47/00* | (2006.01) |
| *G08C 17/02* | (2006.01) |

(Continued)

(52) U.S. Cl.
CPC ............ *E05B 63/04* (2013.01); *E05B 47/0001* (2013.01); *E05B 47/0012* (2013.01); *E05B 47/02* (2013.01); *E05B 47/026* (2013.01); *E05B 49/00* (2013.01); *G05B 19/0405* (2013.01); *G08C 17/02* (2013.01); *E05B 15/004* (2013.01); *E05B 2047/002* (2013.01); *E05B 2047/0027* (2013.01); *E05B 2047/0058* (2013.01); *E05B 2047/0067* (2013.01); *E05B 2047/0086* (2013.01); *E05B 2047/0097* (2013.01); *G07C 9/00571* (2013.01)

(58) Field of Classification Search
CPC ... E05B 2047/002; E05B 81/34; E05B 81/90; E05B 2047/0015; E05B 2047/0022; E05C 9/041
USPC .................. 70/279.1, 275, 277, 278.1–278.3, 70/278.7, 283, 190; 292/142, 144
See application file for complete search history.

(56) References Cited

U.S. PATENT DOCUMENTS

| | | |
|---|---|---|
| 4,148,092 A | 4/1979 | Martin |
| 4,372,590 A | 2/1983 | Pilat et al. |

(Continued)

FOREIGN PATENT DOCUMENTS

WO    WO 9309319 A1    5/1993

OTHER PUBLICATIONS http://en.Wikipedia.org/wiki/worm_drive.*

(Continued)

*Primary Examiner* — Suzanne Barrett
(74) *Attorney, Agent, or Firm* — Taft Stettinius & Hollister LLP

(57) ABSTRACT

Disclosed are various embodiments of lock devices, systems, and methods. A lock of the application can include an internal mechanism to permit backdriven operation and lost motion operation. In one form the lock can be made from an assembly of parts that have locating features that require one way installation/assembly. The lock can include an internal power source capable of driving electronics used to determine handedness of a door.

17 Claims, 26 Drawing Sheets

(51) Int. Cl.
  *G05B 19/04*   (2006.01)
  *E05B 15/00*   (2006.01)
  *G07C 9/00*    (2006.01)

(56) References Cited

U.S. PATENT DOCUMENTS

| | | | |
|---|---|---|---|
| 4,685,709 A | 8/1987 | Kambic | |
| 4,926,664 A | 5/1990 | Gartner et al. | |
| 5,113,675 A | 5/1992 | Uyeda | |
| 5,905,345 A | 5/1999 | Zimmer et al. | |
| 5,979,199 A | 11/1999 | Elpern et al. | |
| 6,012,310 A * | 1/2000 | Hsiao | 70/278.2 |
| 6,244,084 B1 * | 6/2001 | Warmack | 70/278.1 |
| 6,334,636 B1 * | 1/2002 | Huang et al. | 292/144 |
| 6,580,355 B1 * | 6/2003 | Milo | 340/5.7 |
| 6,591,643 B1 * | 7/2003 | Cannella et al. | 70/277 |
| 6,658,905 B1 * | 12/2003 | Hsieh | 70/279.1 |
| 6,739,164 B2 * | 5/2004 | Warmack | 70/257 |
| 6,848,727 B1 | 2/2005 | Cetnar et al. | |
| 6,918,276 B2 * | 7/2005 | Van Parys | 70/257 |
| 8,621,900 B2 * | 1/2014 | Wu et al. | 70/280 |
| 2001/0029760 A1 | 10/2001 | Viney | |
| 2002/0117863 A1 | 8/2002 | Shinkawa | |
| 2005/0110279 A1 | 5/2005 | Kalsi | |
| 2006/0283219 A1 | 12/2006 | Bendz et al. | |
| 2008/0307837 A1 * | 12/2008 | Greiner et al. | 70/282 |
| 2010/0257906 A1 | 10/2010 | Sorensen et al. | |
| 2011/0067464 A1 | 3/2011 | Chiou et al. | |
| 2011/0185554 A1 | 8/2011 | Huang et al. | |

OTHER PUBLICATIONS

International Search Report and Written Opinion dated May 30, 2013 in co-pending PCT/US2013/023805 (10 pages).
International Search Report and Written Opinion dated May 30, 2013 in co-pending PCT/US2013/023734 (11 pages).
International Search Report and Written Opinion dated May 31, 2013 in co-pending PCT/US2013/023800 (10 pages).

* cited by examiner

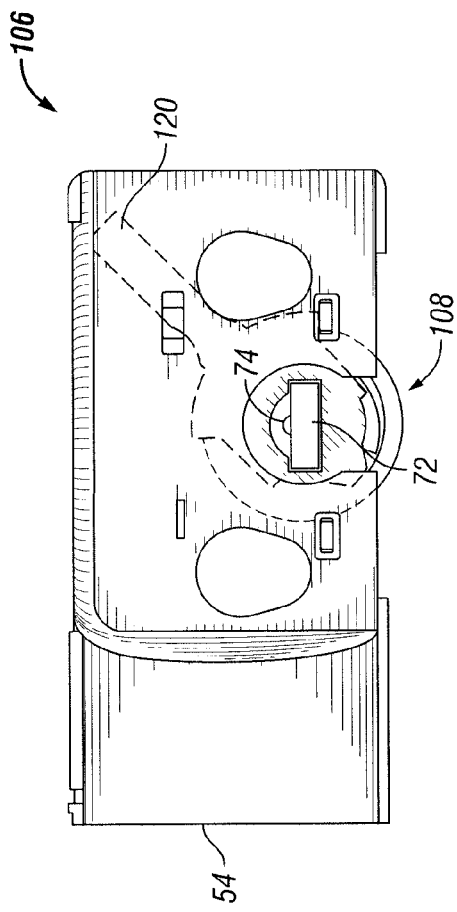
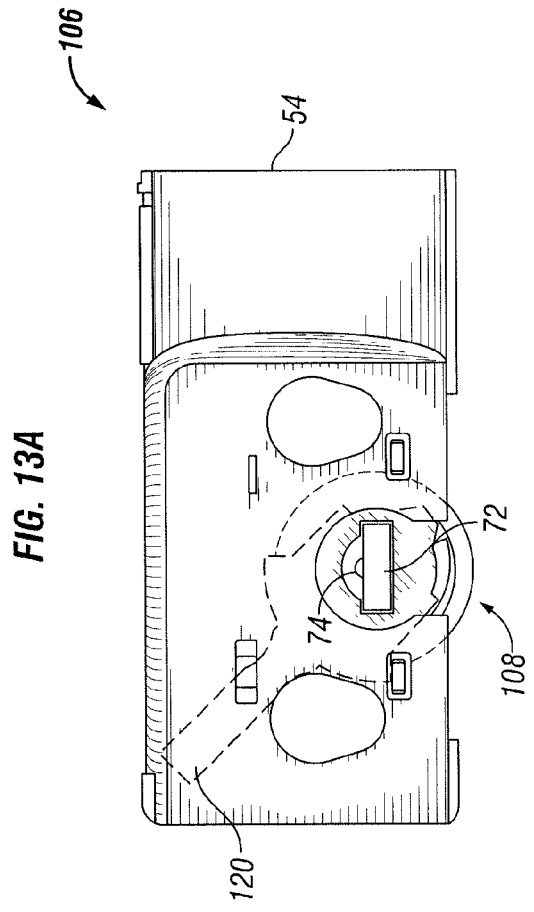
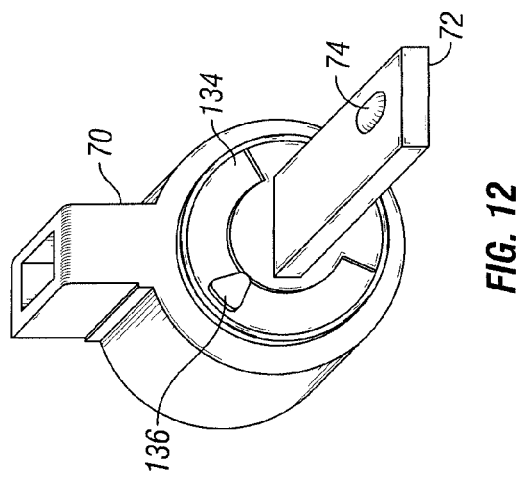
FIG. 13A
FIG. 13B
FIG. 12

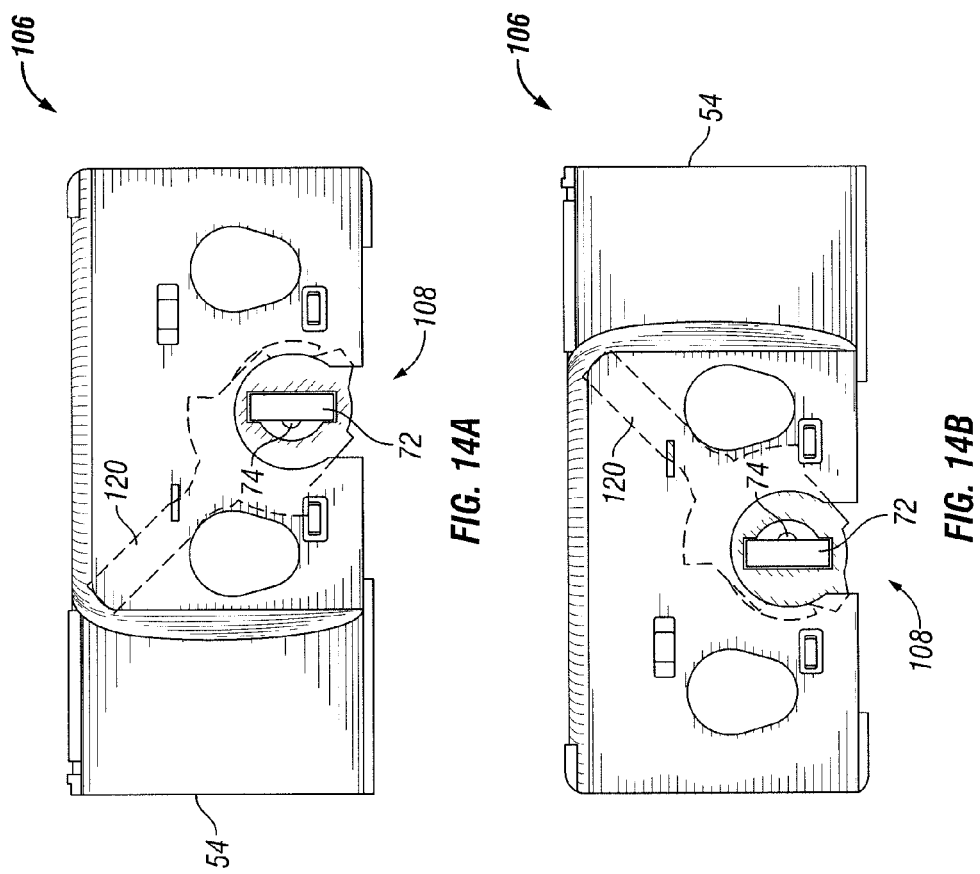

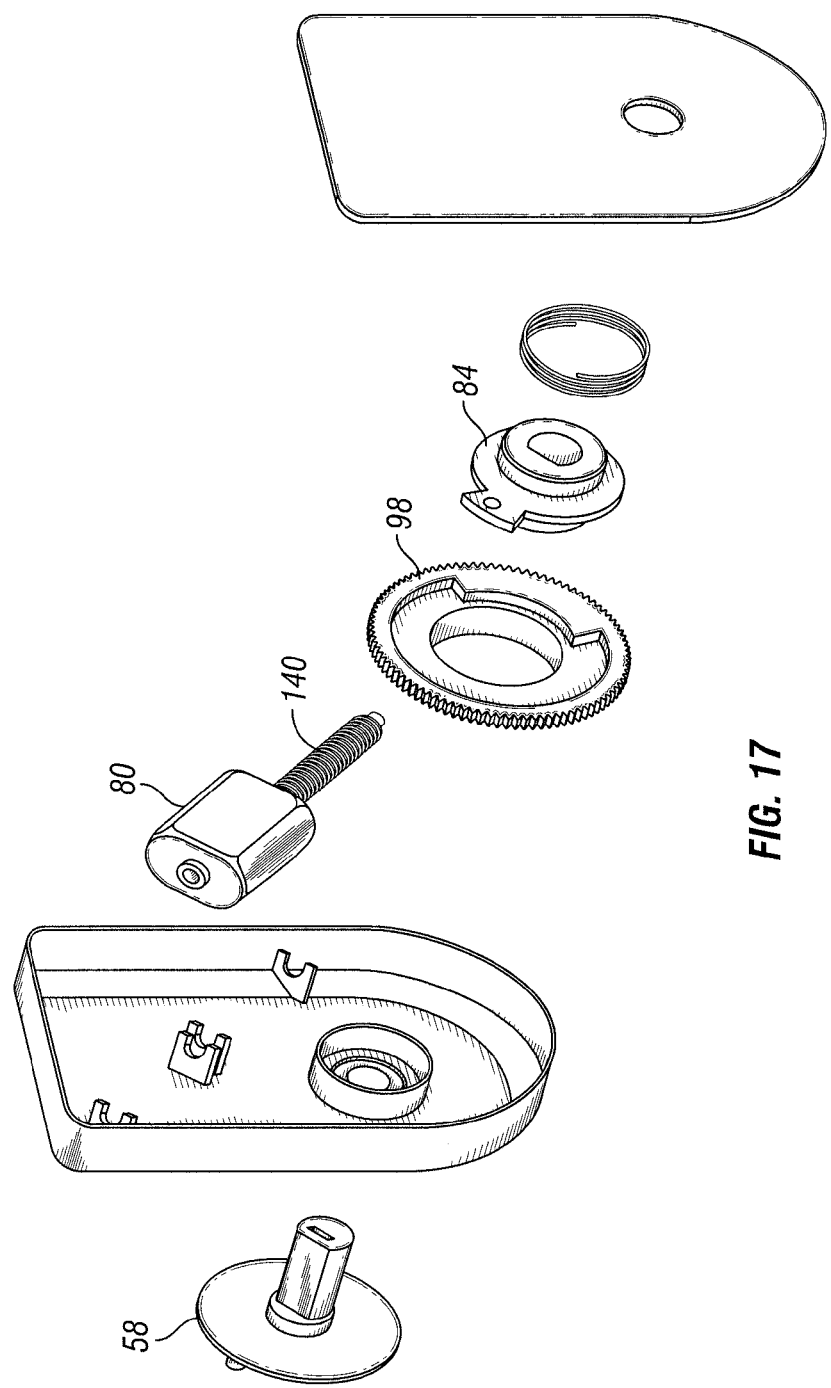

LOCK DEVICES, SYSTEMS AND METHODS

CROSS-REFERENCE TO RELATED APPLICATION

This application claims the benefit of U.S. Provisional Application No. 61/592,358, filed Jan. 30, 2012, which is incorporated herein by reference in its entirety.

BACKGROUND

Providing door lock assemblies that provide locking and unlocking doors remains an area of interest. Some existing systems have various shortcomings relative to certain applications and needs. Accordingly, there remains a need for further contributions in this area of technology. For example, present approaches to electromechanical lock position sensing, control and autohanding, suffer from a variety of drawbacks, limitations, disadvantages and problems. Errors associated with installation and programming of electromechanical locks can compromise lock function. Such errors may increase installation time and cost. They may also cause inaccurate indications of lock malfunction or defects resulting in unnecessary troubleshooting or product returns and exchanges. Installation and programming errors may occur in a number of manners including mistakes in physical assembly of lock components as well as mistakes in configuration and programming of electronic lock components. There is a need for the unique and inventive devices, systems, and methods of electromechanical lock position sensing, autohanding, and control disclosed herein. Present approaches to remote communication with and operation of electromechanical locks face a number of challenges and suffer from a number of limitations and problems. For example, electromechanical door locks often utilize a battery-based power supply. Security, cost, and convenience considerations dictate minimizing current drain and power consumption in order to increase battery life and reduce the uncertainty, expense and inconvenience imposed by dead battery events. The ever-growing presence of competing electromagnetic signals from portable phones, cell phones, wireless internet communications, and other sources further complicate efforts to provide remote operability for electromechanical locks. Additional challenges arise out of the desire to provide remotely operable electromechanical locks that are compatible with preexisting networks and communication protocols and allow interoperation and communication with other devices and systems. Providing such functionality imposes power demands on lock communication and control circuitry that are by the driven by the standards and designs of the existing networks and protocols. Further challenges are presented where the existing network is dynamically configurable. Such networks may utilize techniques for changing, maintaining, organizing or optimizing network configuration which conflict with other design considerations such as power and current drain reduction or minimization, for example, a network control technique may rely upon transceivers being awake, or having a certain wake latency and network performance may suffer due to lack of response from a sleeping transceiver. These and other challenges have presented a need for the unique and inventive devices, systems, and methods disclosed herein.

SUMMARY

One embodiment of the present invention is a unique door lock assembly. Other embodiments include apparatuses, systems, devices, hardware, methods, and combinations for proving powered door bolts. Further embodiments, forms, features, aspects, benefits, and advantages of the present application shall become apparent from the description and figures provided herewith.

BRIEF DESCRIPTION OF THE FIGURES

FIG. 12 depicts an embodiment of a lock cylinder.
FIGS. 13A and 13B depict embodiments of a cam and housing in a left handed door and a right handed door.
FIGS. 14A and 14B depict embodiments of a cam and housing in a left handed door and a right handed door.
FIGS. 16, 17, 18A, and 18B depict an embodiment of a motor, transmission, and driver coupler useful within the back side manipulator portion

DETAILED DESCRIPTION

Figure 1A:
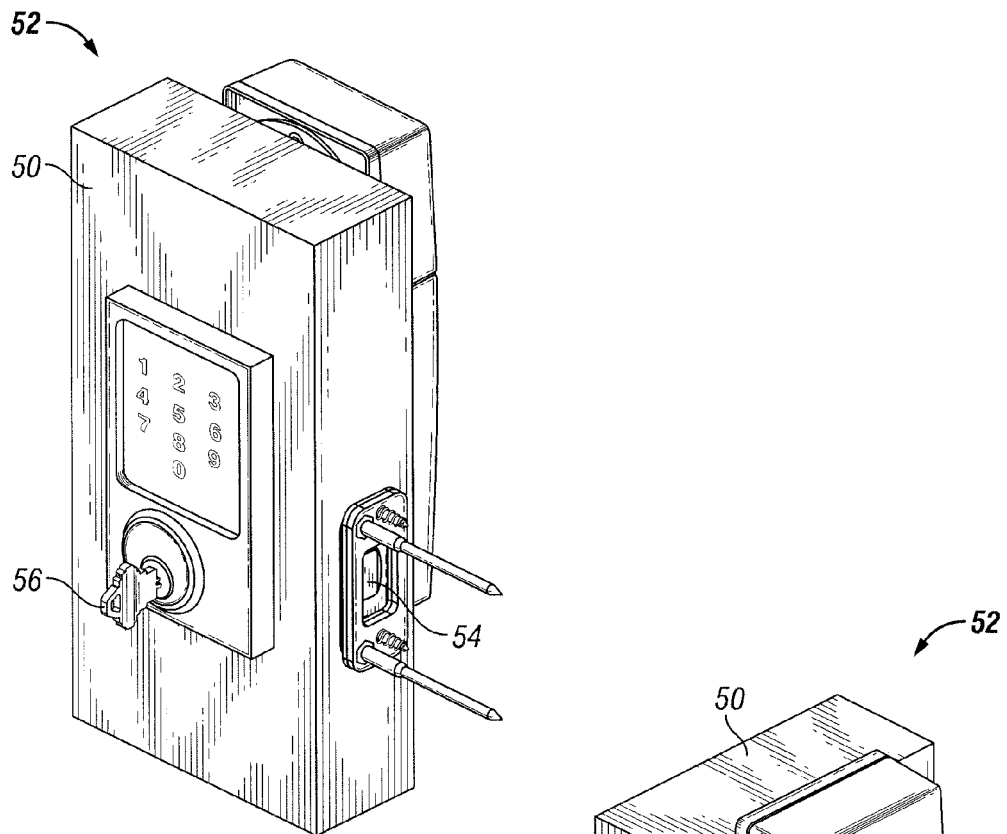
FIG. 1A depicts an embodiment of a door lock assembly.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1B:
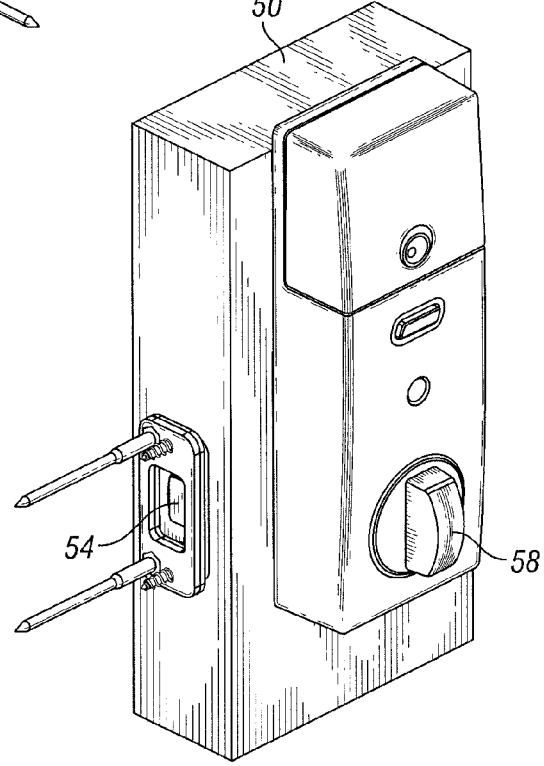
FIG. 1B depicts an embodiment of a door lock assembly.

With reference to FIGS. 1A and 1B, front and back side views are shown of a door 50 having a door lock assembly 52 useful to secure the door to a door jamb or other suitable fixed structure. The door 50 can be any variety of doors used in residential, business, etc. applications that can be used to close off passageways, rooms, access areas, etc. The door lock assembly 52 shown in the illustrated embodiments includes a bolt 54 that can move in to and out of the door jamb when securing the door 50. The bolt can move from a retracted position to an extended position and can include a dead position in which, for example, the bolt resists being retracted when tampered through force applied to the bolt. The bolt can be moved based upon a force imparted through any one or a combination of a motor internal to the door lock assembly 52, a key 56, and a user device 58 depicted in the illustrated embodiment as a thumbturn. The figure also depicts the strike, strike reinforce, and fasteners useful in securing the strike and strike reinforce to the door jamb. Further features of the bolt and its actuation will be described further below.

Figure 2:
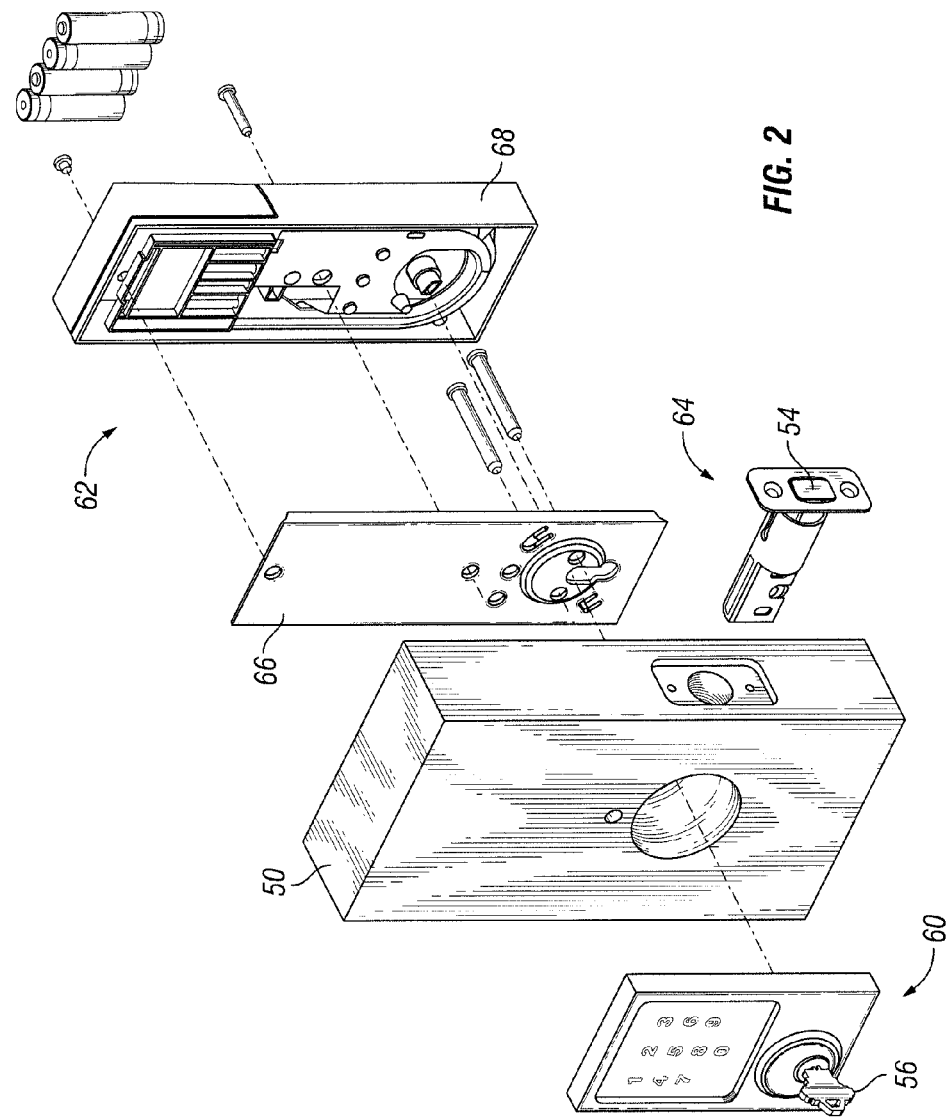
FIG. 2 depicts an exploded view of one embodiment of a door lock assembly.

FIG. 2 depicts an exploded view of the door lock assembly 52 which includes a front side keyed portion 60, back side manipulator portion 62, and bolt portion 64. The front side keyed portion 60 of the illustrated embodiment includes a key cylinder (shown further below in FIG. 3) having a keyhole used to receive a key 56 which can be used to manipulate the bolt 54 to secure the door 50. The front side keyed portion 60 can alternatively and/or additionally include a numeric pad (shown in the illustrated embodiment) that can be used to engage a motor to drive the bolt 54 if provided an appropriate pass code.

The back side manipulator portion 62 of the illustrated embodiment includes a backer plate 66 that can be secured to the door 50 and structured to receive a powered module 68 also useful in manipulating the bolt 54. The backer plate 66 can be affixed to the door 50 using any variety of techniques. In some embodiments the backer plate 66 may not be needed to affix the back side manipulator portion 62 to the door. The powered module 68 can include an energy source for the back side manipulator portion 62, an appropriate motor for activating the bolt, associated electronic controls useful in activating the bolt, etc. which will be discussed in more detail further below.

The front side keyed portion 60 and the back side manipulator portion 62 can be in communication with each other using a variety of mechanisms. Though not depicted, in some embodiments a cabling can be used to connect the front side keyed portion 60 to the back side manipulator portion 62 such that drive signals useful to extend or retract the bolt can be transmitted. For example, in those embodiments having an electronic keypad, the cable can be used to provide power to the keypad from a battery device stored in the back side manipulator portion 62 and/or convey a signal, such as an actuation signal for the motor, from the front side to the back side. Other types of credentialing technologies can also be used in lieu of, or in addition to, the keypad such as but not limited to I button, Body Comm, Smart card, etc. Not all embodiments need include the cabling depicted. The cabling can include one or more conductors to convey power, data signals, etc. In addition, a driver (shown below in FIG. 3) can be coupled with both the front side and back side to receive a force from any of the key 56, the user device 58, or the motor associated with the door lock assembly 52 to activate the bolt 54. The driver can take a variety of forms, one embodiment of which is shown below in FIG. 3.

The bolt portion 64 of the illustrated embodiment includes a housing for enclosing the bolt 54 and can include a bolt driving mechanism (discussed further below in FIG. 10) interposed between the bolt 54 and the driver such that when the driver imparts a force the bolt driving mechanism is moved which consequently imparts a motion to the bolt 54. As will be appreciated given the discussion above, a force can be transmitted via the driver to the bolt driving mechanism of the bolt portion 64 whether through a turn of the key 56 or an actuation of one or more features of the back side manipulator portion 62, or any combination thereof. Further details of the bolt portion 64 are also discussed further below.

Figure 3:
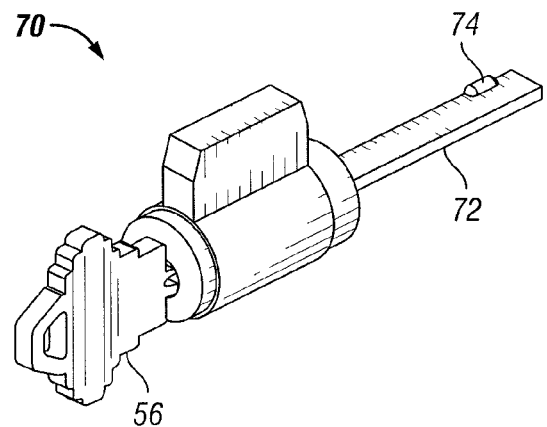
FIG. 3 shows an embodiment of a key cylinder and a driver.

Turning now to FIG. 3, one embodiment of a lock cylinder 70 is shown which can be used in the front side keyed portion 60. The lock cylinder 70 can include any number of conditional features that when met permit the lock to actuate a driver 72 that, as discussed above, can be used to transmit a force to the bolt portion 64 via the bolt driving mechanism. Though the driver 72 is shown as an attached component of the lock cylinder 70 in the illustrated embodiment, not all embodiments need to include a similar construction. For example, in some forms the driver 72 can be attached to a portion of the back side manipulator portion 62 to be received with the lock cylinder 70 upon installation with a door 50. No limitation of how the driver 72 is installed, coupled, fastened, etc. is intended herein.

The driver 72 can take a variety of shapes and configurations. In the illustrated embodiment the driver 72 is depicted as an elongate member having a rectangular cross section, but other embodiments can include different shapes than those depicted. The driver 72 can take the form of a tailpiece, drivebar, etc. In some embodiments the driver 72 can include a locating feature 74 which can be used with other aspects of the door lock assembly 52 to ensure a consistent orientation of the driver 72 during installation. The locating feature 74 can be a localized feature such as a bump, ridge, protrusion, depression, etc that is located in one area, along a periphery, etc of the driver 72. For example, the locating feature 74 of the illustrated embodiment is located on a side near a distal end of the illustrated driver 72 and takes the form of a raised edge. The locating feature 74, however, can be situated at any variety of locations other than that depicted in the illustrated embodiment. In many embodiments the locating feature 74 will require a corresponding device to which the driver 72 is attached to also have a similar arrangement such that the corresponding device is coupled with the driver 72 in only one way. The locating feature can be formed in the driver 72 using any number of techniques such as stamping, forging, crimping, bending, and snipping, to set forth just a few non-limiting examples. Further description of the locating feature 74 and how it is relates to other aspects of the door lock assembly 52 are described below in FIGS. 10-15B.

Figure 4:
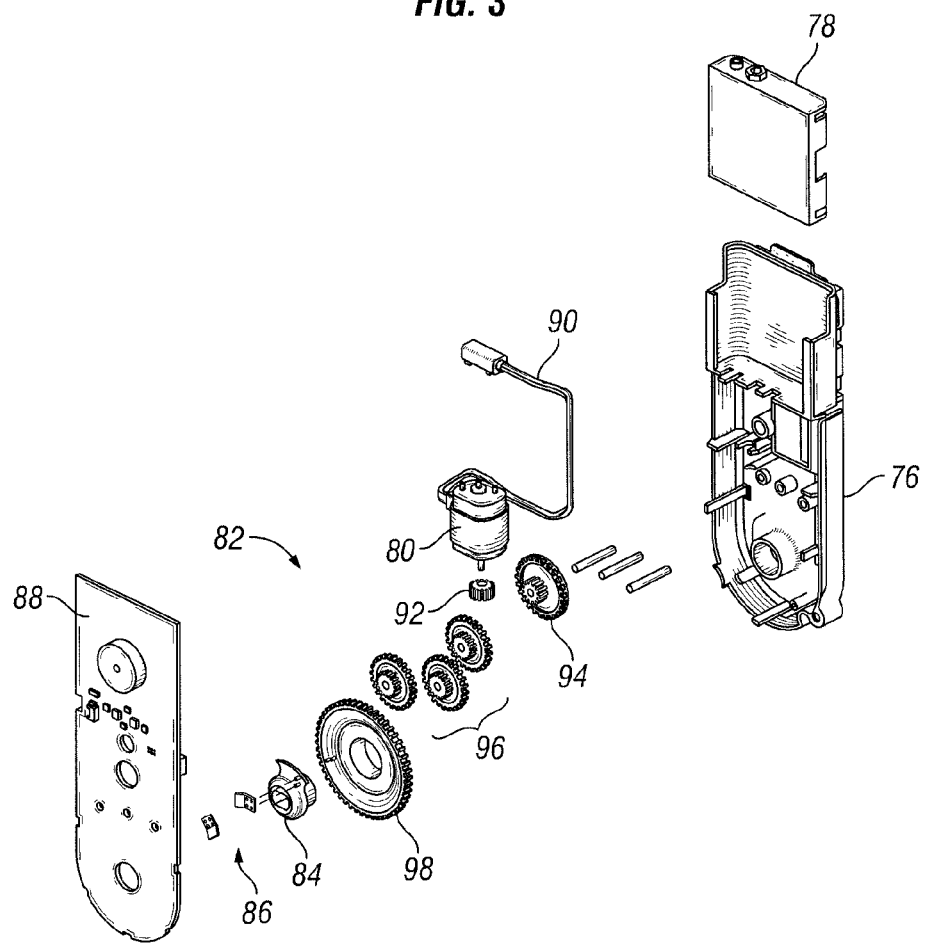
FIG. 4 shows an embodiment of a back side manipulator portion.

FIG. 4 depicts an exploded view of some of the components of the back side manipulator portion 62. Shown in the figure are a baseplate 76, power module 78, motor 80, transmission 82, driver coupler 84, one or more wiper contacts 86, and a circuit board 88. In the illustrated embodiment the baseplate 76 provides a chassis upon which the various components can be integrated prior to being installed on the door 50. The power module 78 includes provisions to retain a supply of power, such as but not limited to batteries. In one embodiment the power module 78 is a holder that can be snapped into place with the baseplate 76 and that includes provisions to receive any number and types of batteries, such as but not limited to size AA batteries. Four AA size batteries are contemplated in one application.

The motor 80 receives power via a cable 90 directly from the power module 78, but in other embodiments can be configured to receive power via the circuit board 88. In one embodiment the motor 80 is a permanent magnet direct current (PMDC) motor available from Johnson Electric, 10 Progress Drive, Shelton Conn., model NF243G, but the motor 80 can take a wide variety of other forms useful to convert power provided by the power module 78 to mechanical output that can be used to actuate the driver 72. In one non-limiting embodiment the motor 80 can consume about 3 W of power, spin an output shaft at between 10,000 rpm and 15,000 rpm, and produce torque between about 4 and 30 mNm. The torque and high spin rate can be conveyed through the transmission 82 to the driver coupler 84 to produce adequate torque and rotation rate to actuate the bolt 54.

The transmission 82 can include any number of gears, shafts, and other appropriate devices used to transmit power between the motor 80 and the driver coupler 84. More or fewer devices than those depicted in the illustrated embodiment can be used in the transmission 82. The transmission 82 can include a pinion gear 92 coupled to an output shaft of the motor 80 which forms the introduction of power to drive a main gear 98. In some embodiments, like the one shown in FIG. 4, a face gear 94 is used and configured to receive torque from the pinion gear 92 which is transmitted via an intermediate gear set 96 to the main gear 98. In some embodiments power, and resultant movement of the transmission, can be transmitted in both directions: from the motor 80 to the main gear 98; and from the main gear 98 to the motor 80, made possible by the arrangement of the various gears as will be readily understood. In one form the pinion gear 92 takes the form of a bevel gear, but other gear configurations are also contemplated herein.

The driver coupler 84 includes a provision which permits it to be movingly connected with the driver 72 such that operation by one or more of the key 56, user device 58, or the motor 80 causes the driver 72 to change positions and actuate the bolt 54. In one form the driver 72 is configured to extend into an opening of the driver coupler 84 and as a result in some embodiments the opening can have a similar contour as the driver 72, including those embodiments having the locating feature 74. On embodiment of the opening in the driver coupler 84 is shown as a center opening feature in the illustrated figure.

The wiper contacts 86 are discussed more fully below but in general are attached, at least one each, to the main gear 98 and the driver coupler 84. The wiper contacts 86 interact with corresponding traces formed in the circuit board 88 and can be used to detect position of either or both the main gear 98 and driver coupler 84. In some forms the circuit board 88 can be configured to process information regarding the state of the bolt 54, such as whether extended or retracted, based upon position of the main gear 98 and driver coupler 84. Further details of this aspect of the application are described further below.

Figure 5:
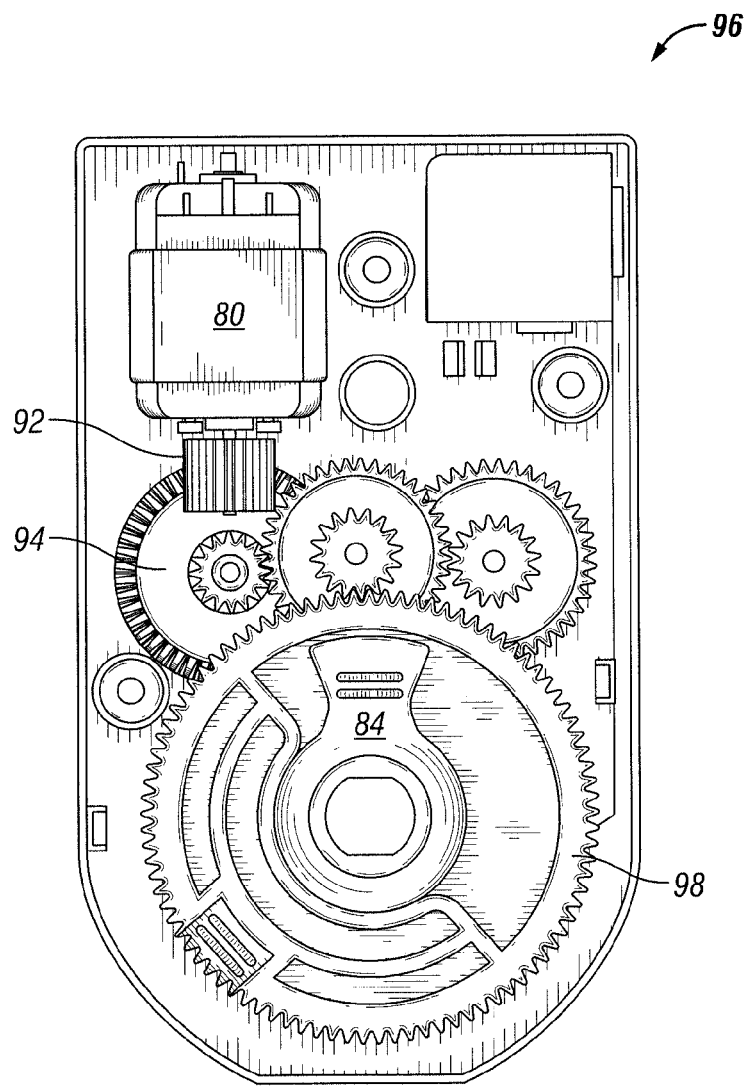
FIG. 5 shows an embodiment of a back side manipulator portion.

FIG. 5 depicts an installed portion of the back side manipulator portion 62, in particular an installed depiction of the motor 80, pinion gear 92, main gear 98, and intermediate gears 96. Of note in this depiction, one of the intermediate gears 96 shown in FIG. 4 is mounted to the same shaft as another of the intermediate gears 96 and is thus hidden from view. During operation of the motor 80 in the illustrated embodiment, power flows through the pinion 92, to the face gear 94, to the hidden intermediate gear 96, to the intermediate gear shown on the right of the figure, the intermediate gear shown in the center of the figure, and finally to the main gear 98.

The main gear 98 can interact with the driver coupler 84 to place the driver 72 in an orientation to either extend or retract the bolt 54. Of note in the illustrated embodiment, the driver coupler 84 includes a center opening 85 into which can be received the driver 72. The center opening 85 can have a shape complementary to the driver 72 to receive the locating feature 74, and in some embodiments the center opening 85 can be structured to receive an intermediate device, such as for example a bushing, that itself receives the driver 72. Various embodiments of the center opening which is used to interact with the driver 72 are shown in FIGS. 16, 19, and 20-22. The various embodiments can have any of the variations contemplated herein.

Figure 7:
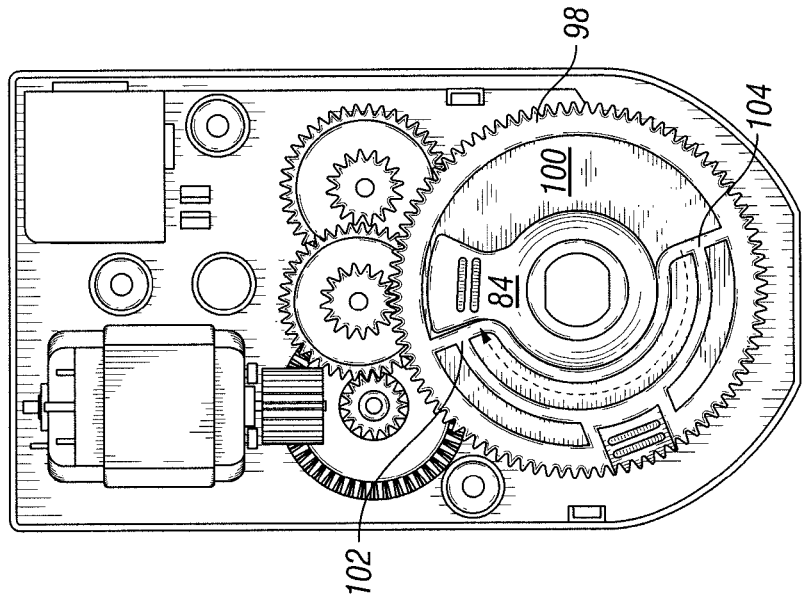
FIGS. 6-9 show one example of movement of a back side manipulator portion.
Figure 6:
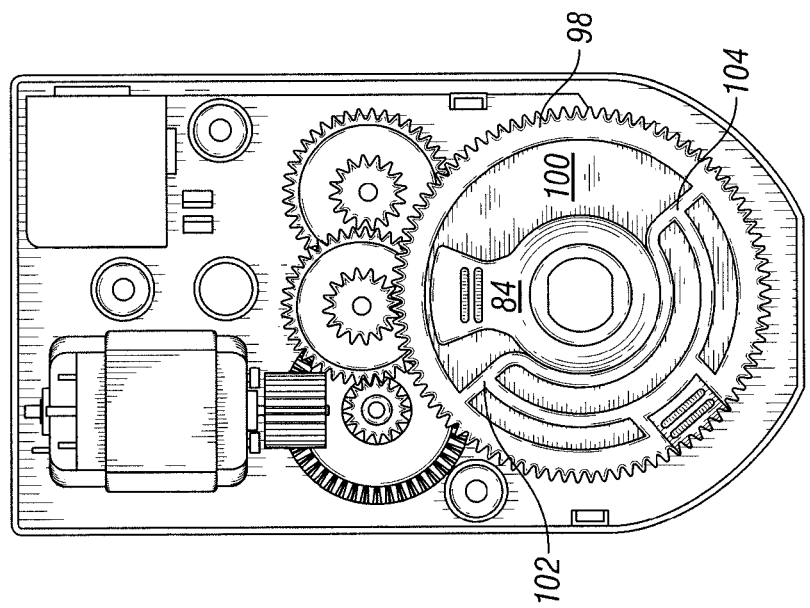
Figure 9:
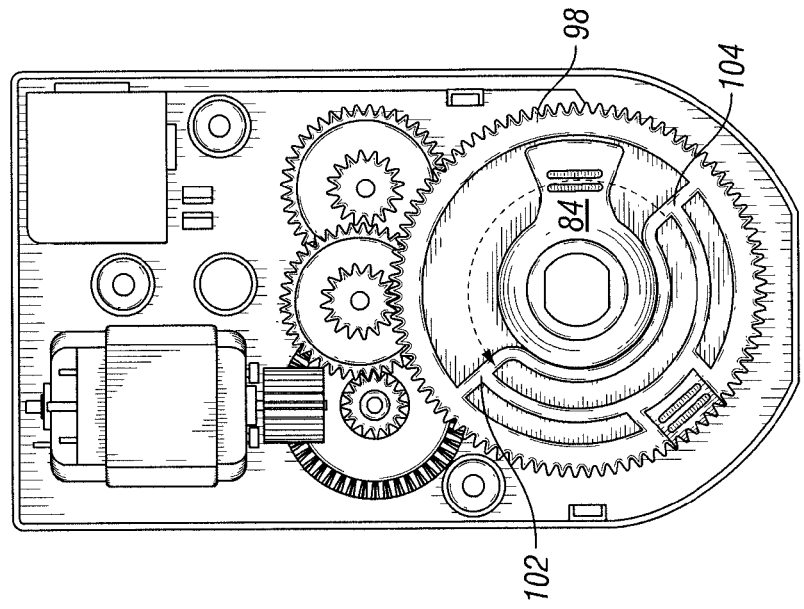
Figure 8:
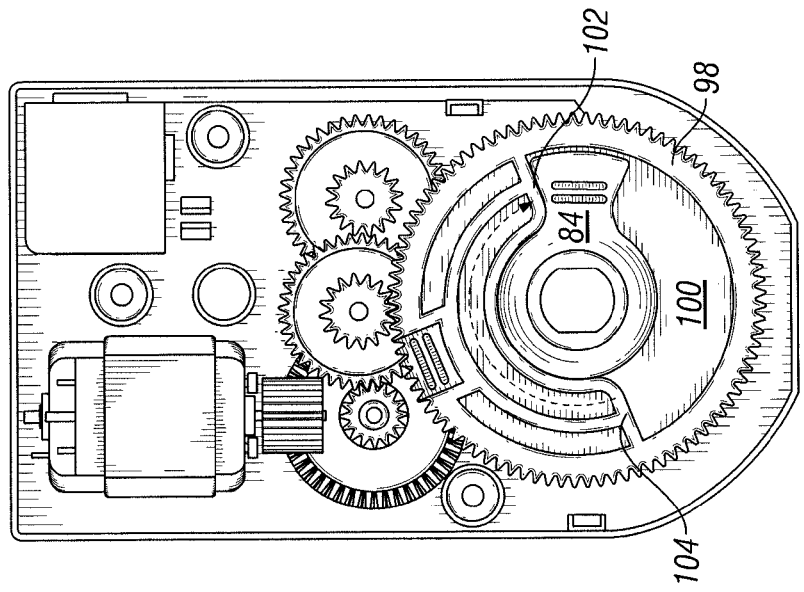

As shown in FIGS. 6-9, an operation is depicted in which the main gear 98 is used to move the driver coupler 84 between positions that correspond to a retracted bolt position and an extended bolt position. The main gear 98 of the illustrated embodiment includes a pocket 100 in which is received the driver coupler 84 and includes an abutment surface 102 and an abutment surface 104 which are both used at various stages of operation to interact with and urge movement of the driver coupler 84. The pocket 100 can be configured to a variety of depths of the main gear 98. Starting at FIG. 6, the driver coupler 84 is in a position that corresponds to a retracted bolt 54, and the abutment surface 102 is set back from the driver coupler 84. Though the illustrated embodiment depicts set back, not all embodiments need include such a space. FIG. 7 corresponds to an activation of the motor 80 in which the main gear 98, and corresponding abutment surface 102, engage the driver coupler 84 to cause movement thereto. The arrow in the figure depicts the direction of movement. FIG. 8 shows further motor 80 movement as the driver coupler 84 is moved to a position that corresponds to a bolt extended position. At this point, and as depicted in FIG. 9, the motor 80 reverses itself and returns the main gear, and corresponding abutment surface 102, to its original starting position. Note that the motion depicted in FIG. 9 of the main gear 98 as it is returned to its original starting position occurs without or with very little corresponding movement of the driver coupler 84. Notice also that in the orientation shown in FIG. 9 the abutment surface 104 is set back from the driver coupler 84. Though the illustrated embodiment depicts set back, not all embodiments need include such a space. Furthermore, the set back associated with the abutment surface 104 and the set back associated with the abutment surface 102 need not be the same.

When the bolt is desired to be returned to a retracted position, the motor 80 can be used to drive the main gear 98, and the abutment surface 104, to engage the driver coupler 84 in the opposite direction Similar progression of events occur to place the driver coupler 84 in a position that corresponds to a retracted bolt position. When accomplished the motor 80 is reversed to return the main gear 98 to its original starting position. In this way the main gear has a wide range of motion that does not affect to a substantial degree movement of the driver coupler 84. The type relative movement described above is sometimes referred to as lost motion given that the main gear 98 has a wide degree of motion that does not translate to the driver coupler 84. Though the lost motion is shown relative to the main gear 98 and the driver coupler 84, other mechanisms can be implemented in the door lock assembly 52 to provide for lost motion similar to that described above. In some embodiments, FIG. 6 can correspond to an extended bolt position, while FIG. 9 corresponds to a retracted bolt position.

Though the illustrated embodiment depicts a pocket 100, not all embodiment need to have a similar construction. To set forth just one non-limiting example, some embodiments may include a non-circular main gear shaped as a crescent in which the driver coupler 84 is situated in the space unoccupied by the crescent. Other shapes and configurations are also contemplated to provide for a lost motion in a mechanism connected to the motor and moveable by the motor, and a mechanism connected to the driver 72 and moveable by the driver.

Some embodiments of the instant application also provide for the ability to operate the bolt 54 manually without aid of, or in spite of, the automatic features associate with driven operation by virtue of the motor 80. For example, it may be desired to manually use a key, or the user device 58, to operate the bolt 54 without aid of the motor 80. Such operation may readily occur in many situations when the main gear 98 is placed in its position described above with regard to FIGS. 7 and 9. The lost motion provided by the relative orientations of the main gear 98 and the driver coupler 84 permit the driver coupler 84 to be moved by either key or user device between the retracted and extend bolt positions. It may also be necessary in some situations to operate the bolt 54 manually when the door lock assembly 52 is operating in a non-standard mode. Such a non-standard mode can correspond to an inability to drive the driver 72 through action of the motor 80, such as can occur as a result of a failure of the motor 80, a controller coupled with the motor 80, an energy source used to drive the motor 80, etc. Such an inability can also result from failure/degradation of a mechanical device interposed between the motor 80 and the driver 72, such as a gear. The driver 72 can fail at any position between and including positions corresponding to bolt extended and bolt retracted orientations.

In one such non-standard mode the main gear 98 can be positioned at the bolt retracted position when a failure/degradation occurs such that the motor 80 is unable to further drive the driver coupler 84 through the main gear 98. In this situation the main gear 98 is positioned outside of a range of motion of the driver coupler 84 making manual adjustment of the bolt position readily available.

In another non-standard mode the main gear 98 can be positioned at the bolt extended position when a failure/degradation occur such that the motor 80 is unable to further drive the driver coupler 84 through the main gear 98. In this situation the main gear 98 is positioned outside of a range of motion of the driver coupler 84 making manual adjustment of the bolt position readily available.

In yet another non-standard mode the main gear 98 can be positioned between the bolt retracted position and bolt extended position when a failure/degradation occur such that the motor 80 is unable to further drive the driver coupler 84 through the main gear 98. Such a situation could occur, for example, via failure of the powered module 68 or of the motor 80. In this situation the main gear 98 can be positioned such that movement of the driver coupler 84 to complete a movement of the bolt 54 cannot be accomplished without corresponding movement of the main gear 98. In those embodiments above in which the motor 80 is interconnected to the main gear 98 via appropriate backdriving arrangement, the driver coupler 84 can impart sufficient torque to overcome the failed motor and reverse the interconnected mechanisms from a relative driving configured to a relative driven configuration. Embodiments of such an arrangement were discussed above.

Figure 10:
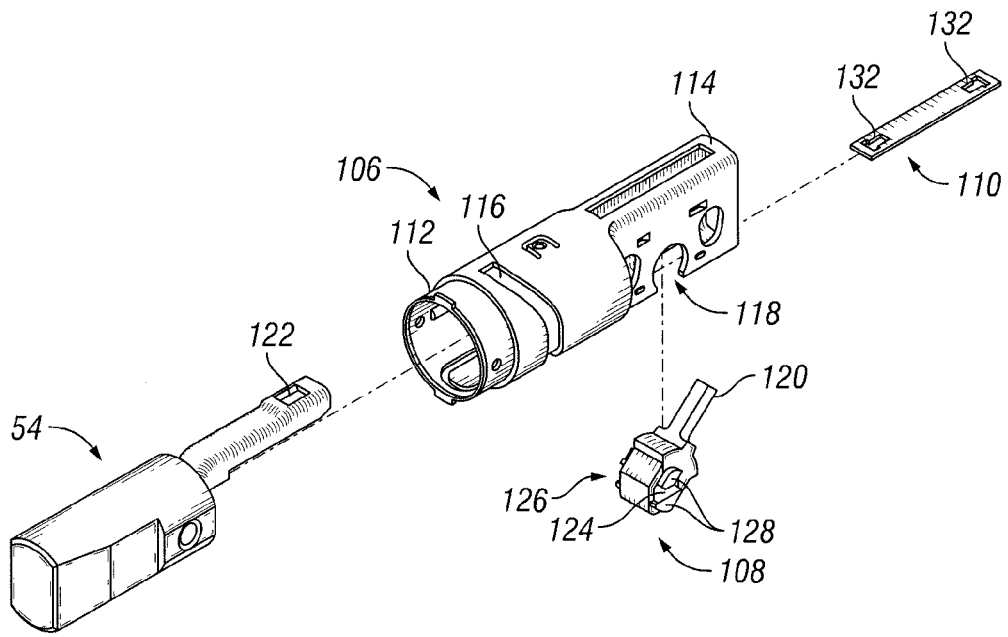
FIG. 10 depicts an embodiment of a bolt and housing.

Turning now to FIG. 10, one embodiment of the bolt portion 64 is disclosed which includes housing 106, a cam 108 configured to be received in the housing 106, and a spring 110 used to retain the cam 108 within the housing 106 and provide a force when the cam is displaced between a bolt retracted position and a bolt extended position. The housing 106 of the illustrated embodiment includes an inner bolt housing 112 and a cam housing 114 which are coupled together via a telescoping action shown by the pathway 116. A guide pin associated with the inner bolt housing 112 can extend into the pathway 116 and allow for the rotation and translation of the housing 112 relative to the housing 114. Such ability to have a telescoping feature allows the bolt portion 64 flexibility in use in various applications, including residential, commercial, etc that may have varying installation requirements.

The cam 108 is configured in the illustrated embodiment to be received in an opening 118 of the housing 106 prior to installation of the spring 110 to close off the bottom of the opening 118 in the housing 106. The opening 118 depicted on the side of the housing 106 can have a semi-circular shape formed in its side and that near the bottom of the opening can include a passage narrower than a diameter of the semi-circular shape. More details regarding the opening 118 will be discussed further below.

The cam 108 includes an extension 120 that can be engaged with an aperture 122 associated with the bolt 54, though other suitable structure of the bolt 54 can also be used to engage the extension 120 to the bolt. The cam 108 also includes an opening 124 into which is received the driver 72. The cam 108 is rotated when the driver 72 is actuated by any of the key 56, user device 58, and the motor 80. Though the cam 108 of the illustrated embodiment includes an opening to receive the driver 72, some embodiments can include other suitable surfaces that can be engaged with the driver 72. When the cam 108 is rotated within the housing the extension 120 subsequently reacts with the aperture 122 to extend or retract the bolt relative to the housing 106. The cam 108 can include a bottom surface 126 that is non-circular relative to an axis of rotation of the cam 108 such that the cam 108 follows an elliptical path and urges against the spring 110 which provides an opposing force when the cam 108 is rotated. A top surface 130 of the cam 108 engages an interior top portion of the housing 106 during rotation to constrain movement. In one form the bottom surface 126 includes one or more flat surfaces that can be connected via a rounded corner, to set forth just one non-limiting example.

Figure 11A:
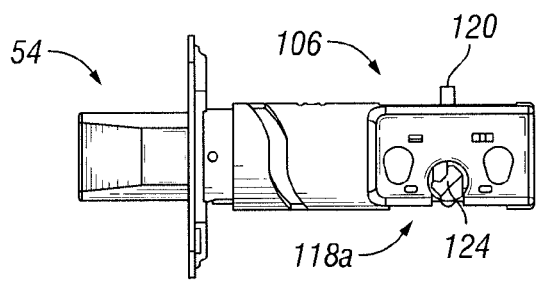
FIGS. 11A and 11B depict views of a housing.
Figure 11B:
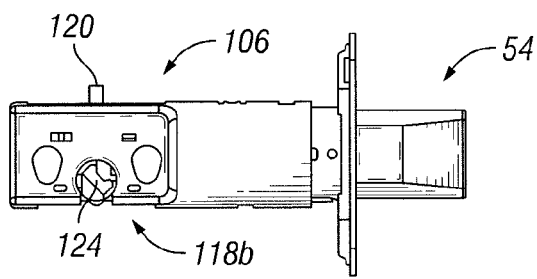

In one embodiment the cam 108 also includes one or more features 128 on one or more portions of the cam 108 which are used to interact with and determine the orientation of the cam when it is received within the housing 106. The feature(s) 128 of the cam 108 are also arranged relative to the opening 124 to provide a unique combination of the two, a combination that also provides a certain arrangement of the opening 124 relative to the housing 106 by virtue of the arrangement of the cam 108 to the housing 106. In some embodiments the features 128 can be found on one or both lateral sides of the cam 108, as is depicted in the illustrated embodiment, but other locations are also contemplated herein. In some forms the features 128 are physical portions that are raised with respect to other portions of the cam 108. In other additional and/or alternative embodiments the features take the form of various shapes and sizes that can cooperate with one or more portions of the housing 106 so to provide a consistent orientation of the cam 108, and by extension the opening 124 of the cam 108, relative to the housing 106. Referring now to FIGS. 11A and 11B, and with continuing reference to FIG. 10, side views are shown of one embodiment of the bolt portion 64 which depicts corresponding structure of the housing 106 that are used to interact with the feature(s) 128 of the cam 108. In FIG. 10 the corresponding structure of the housing 106 takes the form of opposing openings 118 which have been designated as 118a and 118b for ease of reference to distinguish one embodiment of the housing 106. Though the openings 118a and 118b are used to interact with the feature(s) 128, the corresponding structure in the housing 106 can take forms other than openings to ensure consistent orientation of the cam 108 during installation.

The openings 118a and 118b of the illustrated embodiment differ in certain respects from each other to assist in locating an appropriate orientation of the cam 108. The opening 118a is shown as a semi-circular opening that includes a bottom portion narrower than a diameter of the semi-circle, and in particular is shown in the illustrated embodiment as 0.290 inches. The opening 118b is also shown as semi-circular but includes a bottom portion that is closer to a diameter of its associated semi-circular opening portion than the opening 118b. The bottom of the opening 118b is shown in the illustrated embodiment as 0.360 inches. In certain embodiments the feature(s) 128 of the cam 108 permit a single installation orientation of the cam 108 to the housing 106, and by extension only a single installation orientation of the opening 124 relative to the housing 106. If another installation orientation of the cam 108 is attempted, the feature(s) 128 interfere with the housing 106, and in some embodiments the openings 118a and 118b, to prohibit such an installation orientation. In this way errors in the installation orientation of the cam 108 are mitigated.

The extension 120 of the cam 108 is shown as extending through the housing 106. In this position of the extension 120 the orientation of the opening 124 is shown in FIGS. 11A and 11B as extending along a line that that is approximately 45 degrees. As the cam 108 is rotated such that the extension 120 is pointed toward the bolt 54, the opening 124 will be rotated to the vertical position in the illustrated embodiment. As the cam 108 is rotated such that the extension 120 is pointed away from the bolt 54, the opening will be rotated to a horizontal position, again in the illustrated embodiment. Were it not for one or more features of various embodiments described above, the relationship of the orientation of the opening 124 to the housing 106 may not be assured across all assembly operations of the bolt portion 64.

The spring 110 is used to provide a force to urge the cam toward one or both of the extended positions or retracted positions. The spring 110 includes lips 132 that are used to engage the housing 106 to form a leaf spring against which the bottom surface 126 of the cam 108 is urged when the cam 108 is rotated by action of the driver 72.

Turning now to FIG. 12, an embodiment of the lock cylinder 70 and driver 72 are shown. The driver 72 includes an embodiment of the locating feature 74 in the form of a raised dimple positioned toward a middle point near an end of the driver 72. The lock cylinder 70 is also coupled with a plug 134 which can be used to retain the driver 72 with the lock cylinder 70. The plug 134 can be coupled with the lock cylinder 70 using any variety of techniques such as through a press fit, coupled via screw threads, fastened using a rivet, nail, screw, etc. to set forth just a few examples. The plug 134 can include features (not shown) that ensure a consistent orientation of the plug 134 with the lock cylinder 70 from installation to installation.

The coupled assembly also includes a post 136 oriented to interfere with a movement of the driver 72. In one form the post 136 prevents over-rotation of the driver 72 such that a horizontal position of the driver 72 always results in a certain configuration of the locating feature 74 relative to a housing of the lock cylinder 70 and/or the cam 108. In the illustrated embodiment the interactive operation of the post 136 and driver 72 requires that driver 72 be rotated to place the locating feature 74 on the top of the driver 72 when the driver 72 is in the horizontal position. In other words, the post 136 is so situated as to prevent the locating feature 74 to be located on the bottom of the driver 72 when the driver 72 is in the horizontal position owing to the interfering nature of the post 136. Other embodiments can permit the locating feature 74 to be placed in other locations while the driver 72 is in the horizontal position. The post 136 can take a variety of forms and be placed at a variety of locations. In one non-limiting embodiment the post 136 extends into a path of the driver 72, or a structure coupled to the driver, to block motion of the driver 72. Thus, in one form the post 136 permits the driver 72 from traversing approximately 180 degree rotation before the post 136 interferes with further movement of the driver 72. In some applications the post 136 can be located internal to the plug 134. The post 136 can take a variety of shapes and sizes and in some forms multiple posts 136 can be used.

Turning now to FIGS. 13A and 13B, two depictions are shown of the cam 108 installed in a housing 106 and in a position in which the bolt 54 is in a retracted orientation. FIG. 13A depicts a left handed door, and FIG. 13B depicts a right handed door. Each of the orientations depict the driver 72 in a horizontal position with its locating feature 74 on top, and the extension 120 of the cam 108 pointed away from the bolt 54. The locating feature 74 is received into an adequate opening in the cam 108, such as the formation 138 shown in FIG. 15. The formation 138 can take any variety of shapes sufficient to accept various configurations of the locating feature 74. The formation 138 can be complementary in shape and size, and in some embodiments can be other shapes and sizes sufficient to receive the locating feature 74.

FIGS. 14A and 14B depicts a position of the cam 108 installed in a housing 106 and in a position in which the bolt 54 is in an extended orientation. FIG. 14A depicts a left handed door, and FIG. 14B depicts a right handed door. Each of the orientations depict the driver 72 in a vertical position with its locating feature 74 toward the bolt 54, and the extension 120 of the cam 108 also pointed toward the bolt 54.

Figure 15A:
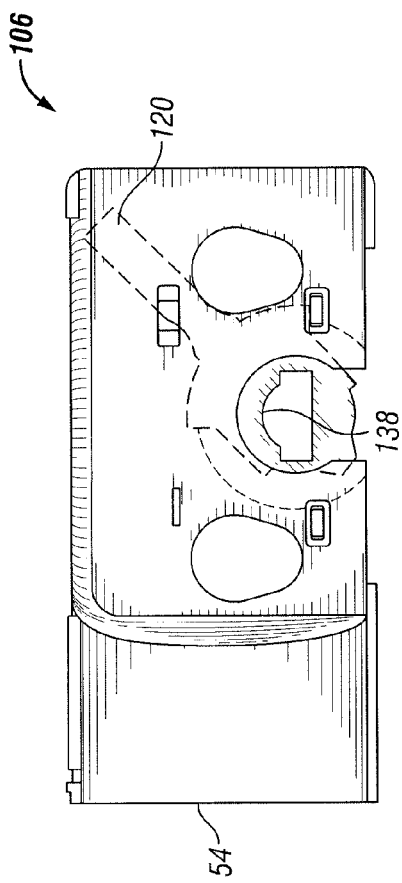
FIGS. 15A and 15B depicts embodiments of a cam and a housing.
Figure 15B:
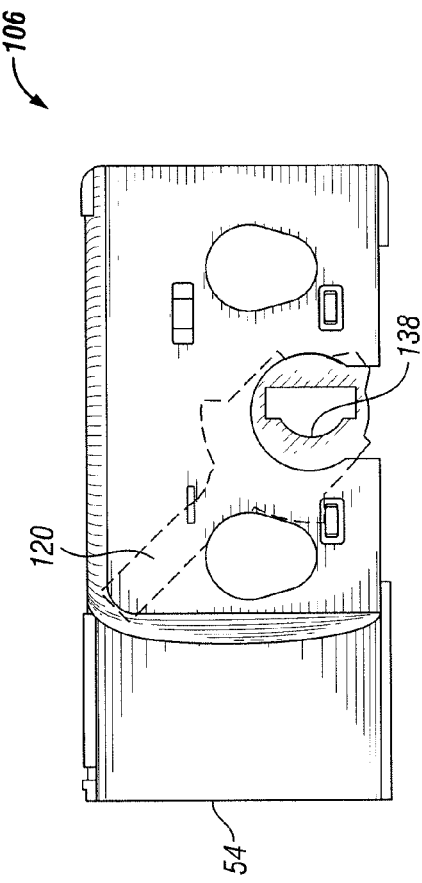
Figure 15:
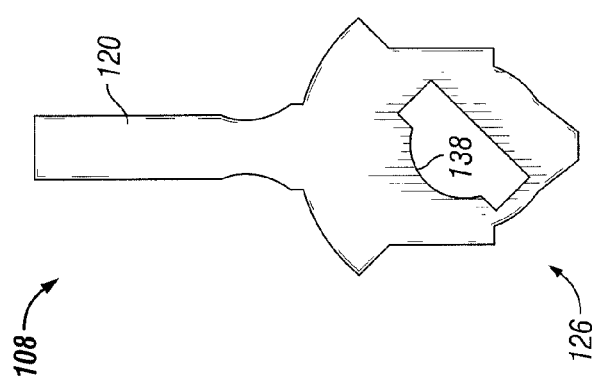
FIG. 15 depicts an embodiment of a cam.
Figure 16:
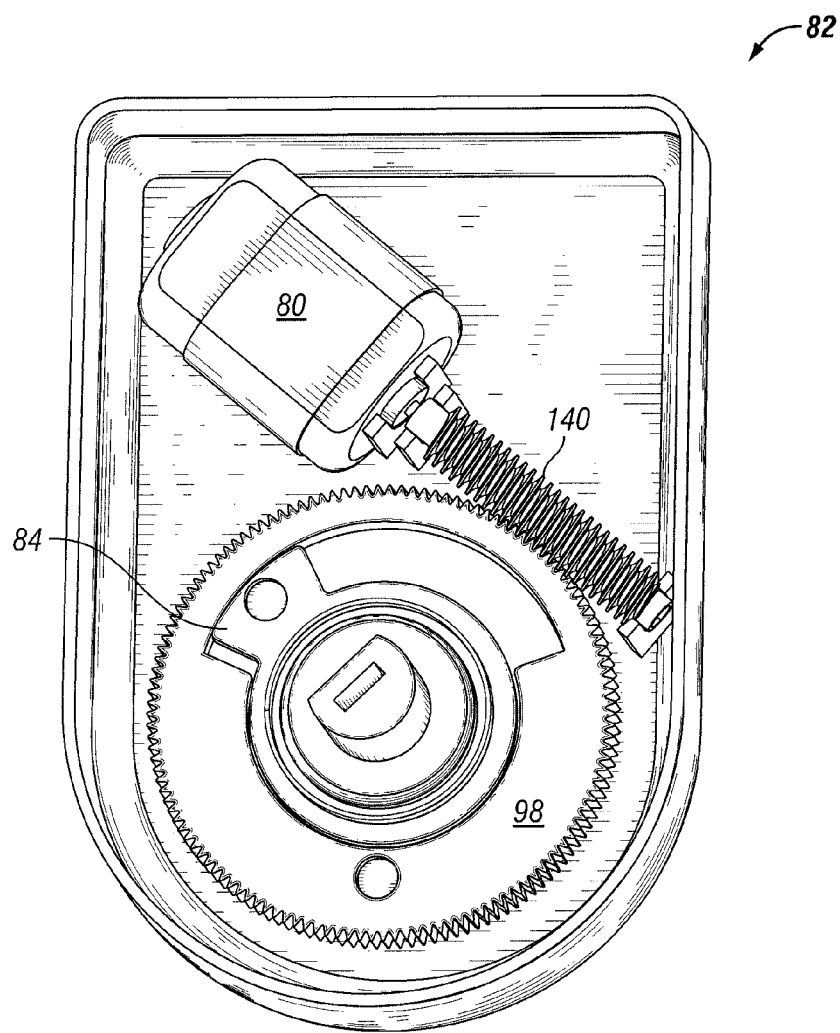

FIGS. 15A and 15B depict the cam 108 installed within the housing 106 prior to receipt of the driver 72. FIG. 15A depicts the bolt 54 in the retracted position, and FIG. 15B depicts the bolt 54 in the extended position.

Figure 18A:
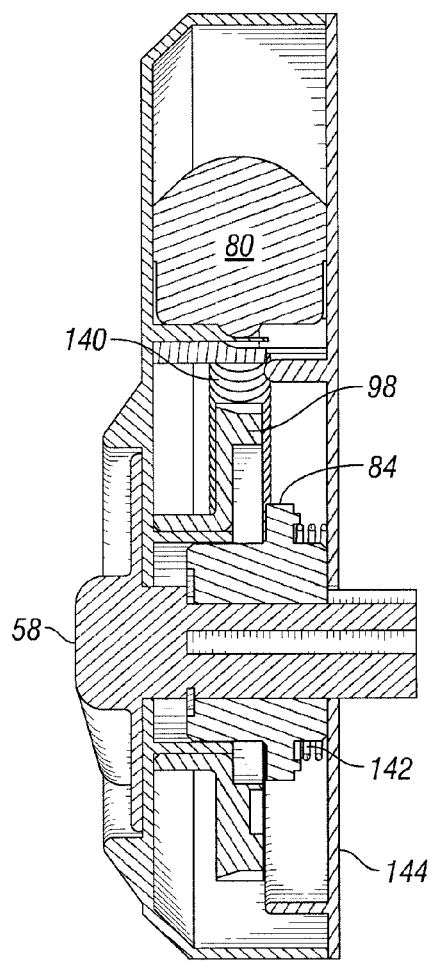
Figure 18B:
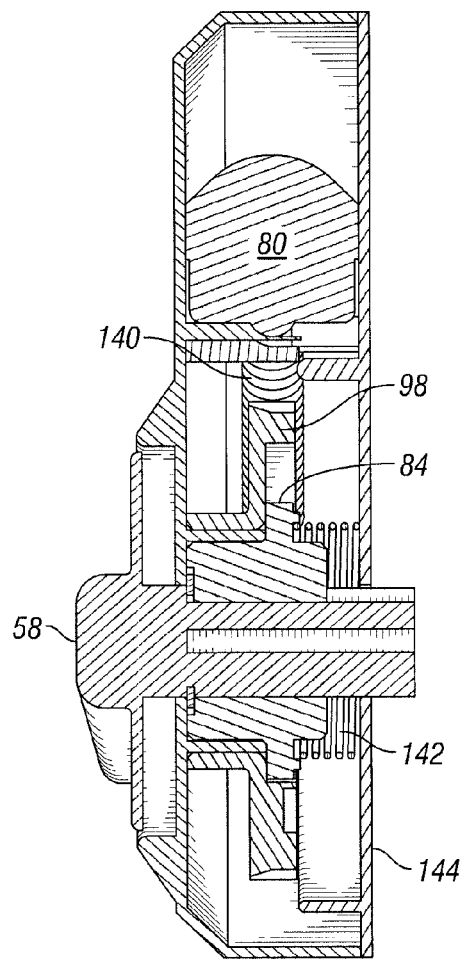
Figure 19:
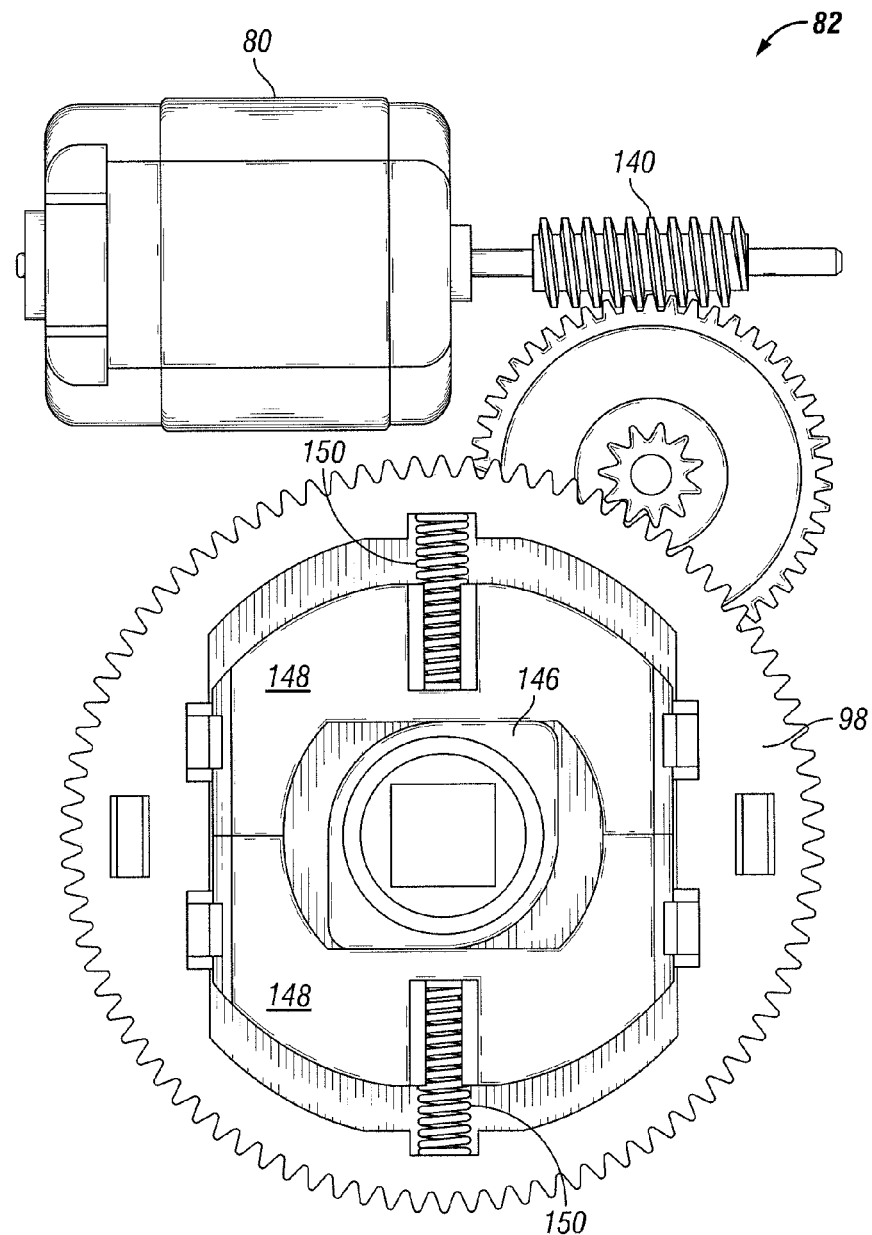
FIGS. 19-22 depict an embodiment of a motor, transmission, driver coupler, and worm gear that can be used within the back side manipulator portion.
Figure 20:
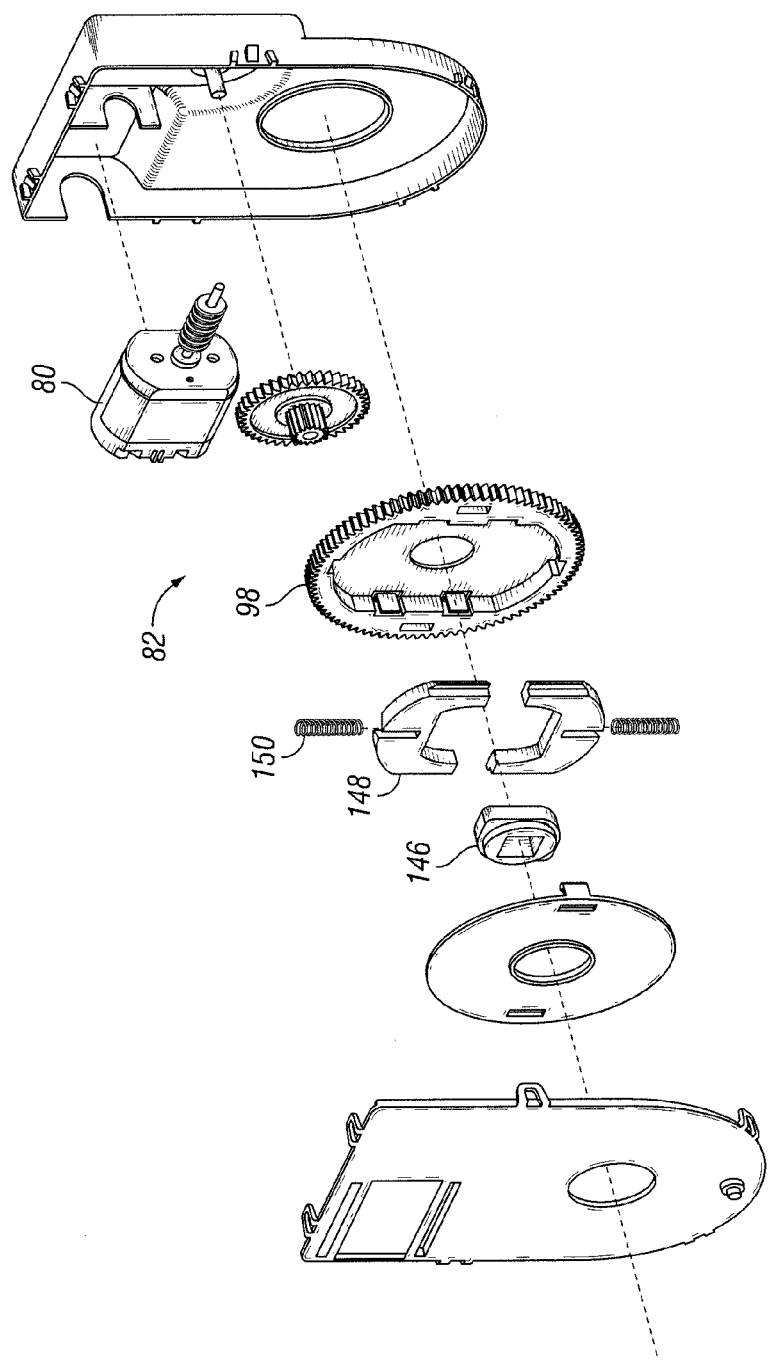

Turning now to FIGS. 16, 17, 18A, and 18B, another embodiment of a motor 80, transmission 82, and driver coupler 84 is depicted. The motor 80 is configured to drive a worm gear 140 which, when rotated, interacts with gear teeth of the main gear 98 causing the main gear 98 to turn. The embodiment disclosed in FIGS. 16, 17, 18A, and 18B can have a lost motion relationship between the main gear 98 and the driver coupler 84 similar to that disclosed above. FIGS. 17, 18A, and 18B depict an exploded view and a working view of the embodiment of FIG. 16. The illustrated embodiment includes a spring 142 disposed between a relatively fixed structure 144 and the driver coupler 84 which urges the driver coupler 84 toward the main gear 98. The spring 142 is depicted as a coil spring in the illustrated embodiment but can take on additional forms in various other embodiments sufficient to urge the driver coupler 84 toward the main gear 98. In some forms the spring 142 could take the form of an elastomeric member, among potential others.

The driver coupler 84 is connected to move with the user device 58 (depicted as a thumb turn in the illustrated embodiment) such that when the spring urges the driver coupler 84 toward the main gear 98 the user device 58 is urged away from the main gear 98 thus creating a space or gap as shown in FIG. 18B. If, during operation, the main gear 98 becomes stuck in a position that interferes with operation of the bolt 54, the user device 58 can be depressed toward the main gear 98 to disengage the driver coupler 84 from the main gear 98 thus permitting movement of the driver coupler 84 and subsequent free movement of the bolt 54.

FIGS. 19-22 depict another embodiment of motor 80, transmission 82, driver coupler 84, and worm gear 140. Another clutch is depicted in this embodiment which permits the driver coupler 84 to be disengaged from the motor 80, transmission 82, and/or main gear 98 upon failure of the system at a location where an override can be useful. The clutch operates by locating a cam 146 that can be connected to the driver coupler 84 in a space captured by cam followers 148. The followers 148 are connected to move with the main gear 98 and are urged against the cam 146 through use of springs 150. Though not depicted, this embodiment can include the lost motion capabilities described in various embodiments above.

Figure 21:
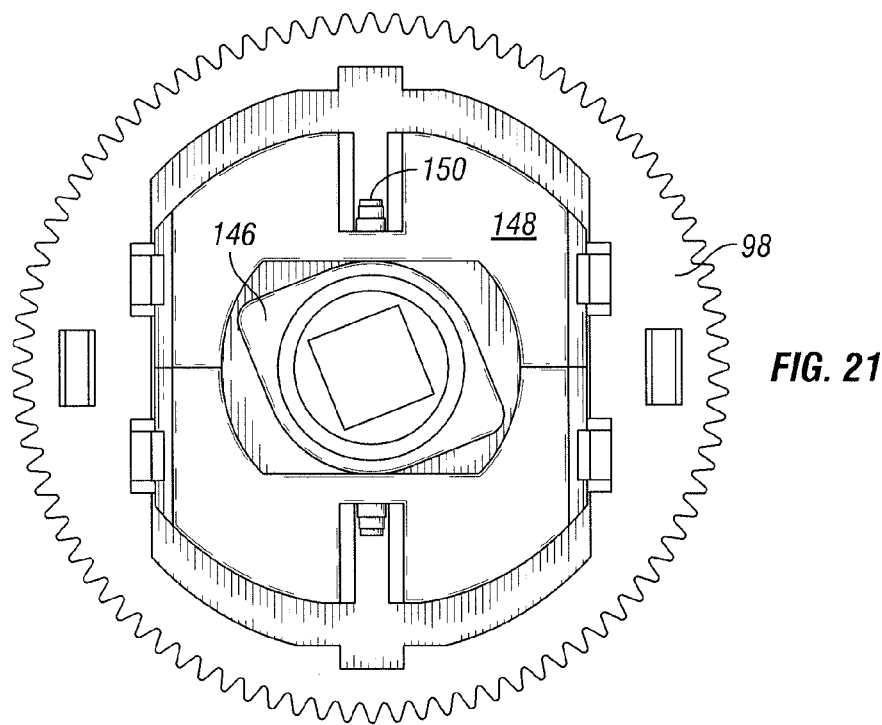
Figure 22:
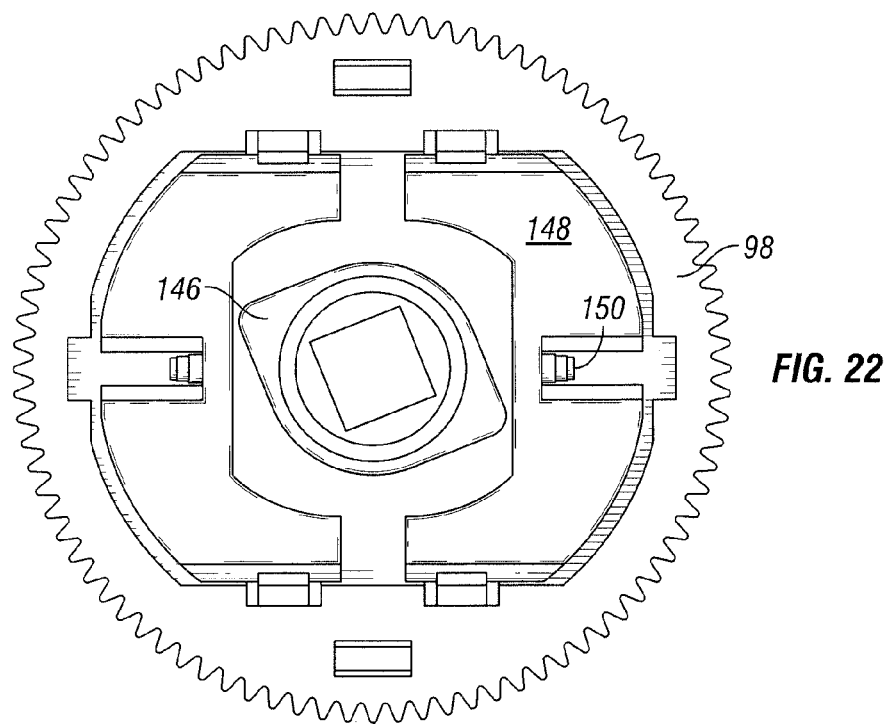

When operated the cam followers 148 can be used to capture the cam 146 such that rotation of the main gear 98 causes rotation of the cam 146. The cam 146 can be connected to the driver 72 and though the center aperture of the cam 146 is depicted as square, the center aperture can have any variety of other shapes and sizes, such as but not limited to those shapes and sizes suitable for receiving any of the various embodiments of the driver having the locating feature 74. During non-standard operation, such as for example a failure of the motor 80, the cam 146 can be actuated by a thumb turn or other suitable user device to override the cam followers 148 causing compression of the springs 150 and movement of the cam followers 148 as shown in FIG. 22. It is also possible in some modes of operation to rotate the cam 146 within the space between the cam followers 148 as shown in FIG. 21.

Figure 23:
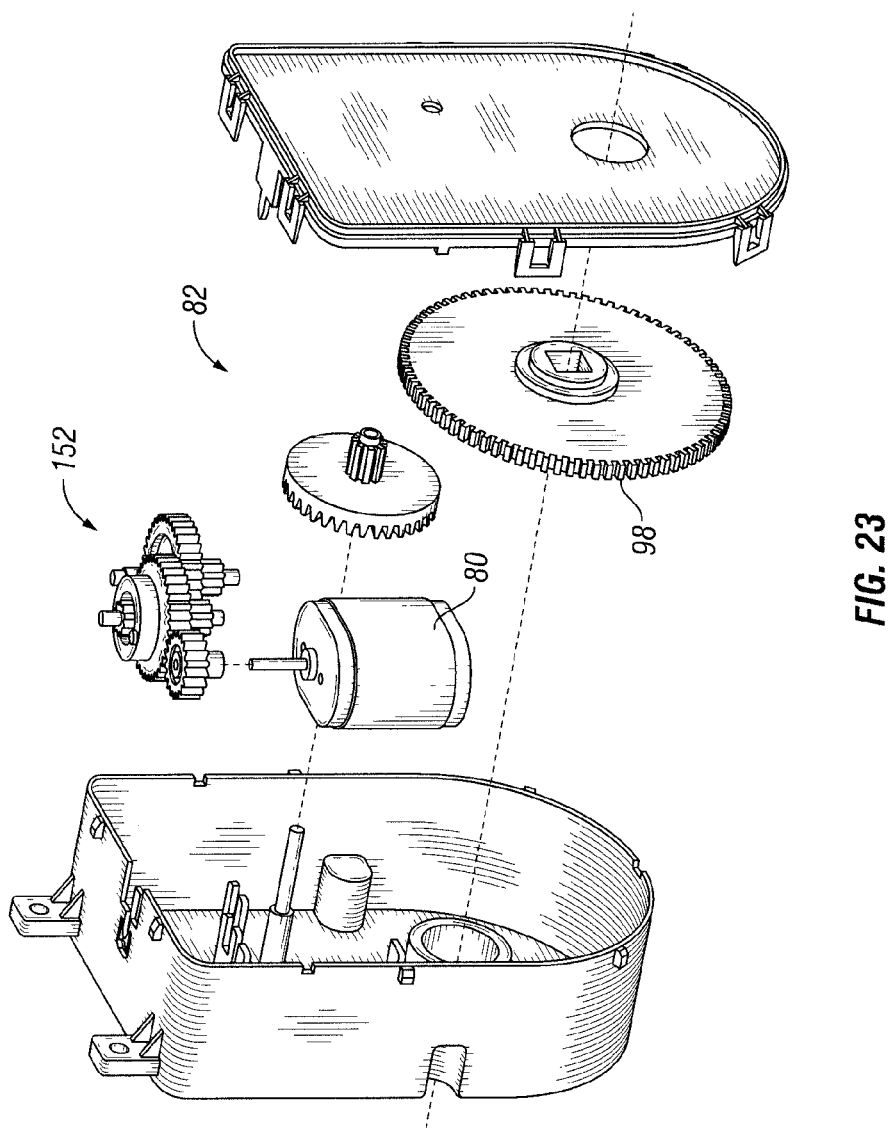
FIG. 23-24 depict another embodiment of a motor and transmission.
Figure 24:
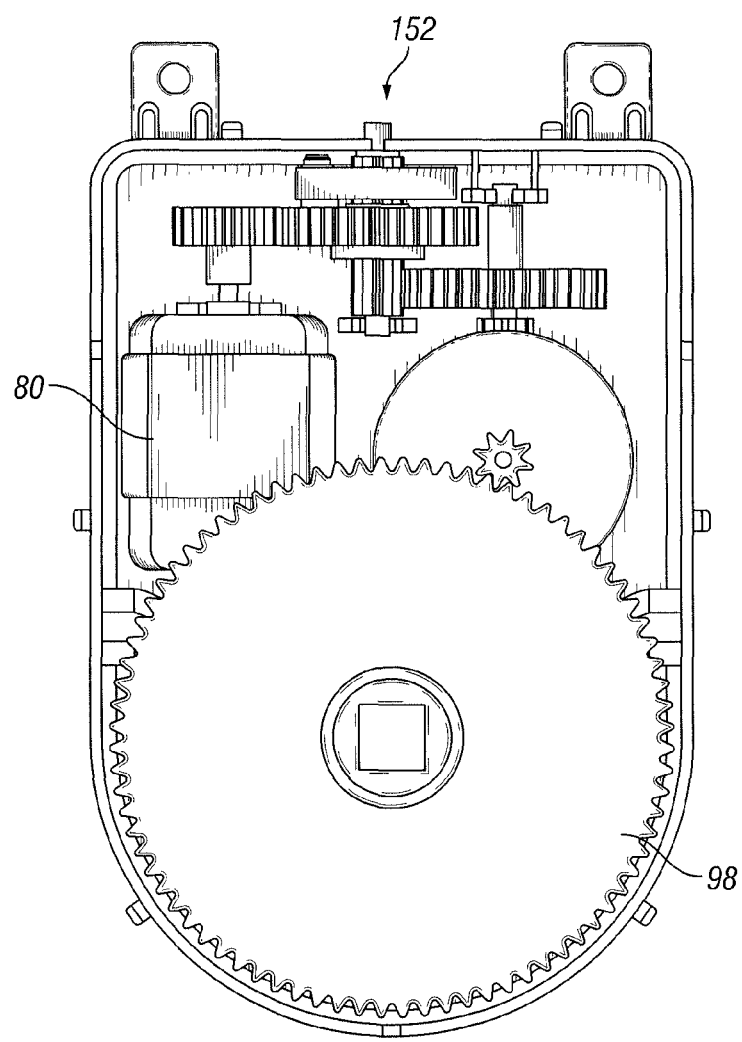

FIGS. 23 and 24 depict another embodiment of motor 80 and transmission 82. Not shown is a driver coupler 84 but it will be understood that the main gear 98 can be configured according to any of the variations herein to incorporate the driver coupler 84 and/or cam. A centrifugal clutch 152 is included that permits the main gear 98 to be decoupled from the motor 80 so long as the motor is spinning at an insufficient speed to activate the centrifugal clutch 152. Any variety of gearing arrangements can be provided in the transmission between the main gear 98 and the centrifugal clutch 152, and between the centrifugal clutch 152 and the motor 80, other than the arrangement depicted in FIGS. 23 and 24. Though not depicted, this embodiment can include the lost motion capabilities described in various embodiments above.

During operation the motor 80 can spin to sufficient speeds to activate the centrifugal clutch 152 and cause subsequent motion in the main gear 98 to move the driver coupler 84 and as a result the bolt 54. If a failure or degraded performance occurs and the motor is unable to spin to sufficient speeds to activate the centrifugal clutch 152, the driver 72 can be actuated using any of the key 56 and/or user device 58 to move the bolt 54, which in the illustrated embodiment also results in movement of the main gear 98. The main gear 98, however, is decoupled from the motor 80 by virtue of the ineffective operation of the centrifugal clutch 152, and is thus allowed to rotate with little impact from the failure and/or degradation.

Given the description above, various aspects of the application, either individually or in a variety of combinations, can be used to ensure consistent relative orientation of the driver 72, cam 108, housing 106, driver coupler 84, user device 58, and lock cylinder 70. The instant application discloses features at the respective interfaces of components such as the tail piece, bolt housing, and bolt cam that can be used with any or all of these such that the entire assembly is arranged consistently over all manufacturing and/or installation operations. Such features disclosed herein can be used to mistake-proof manufacturing and/or installation, an approach which is sometimes referred to as "poka-yoke".

Figure 25:
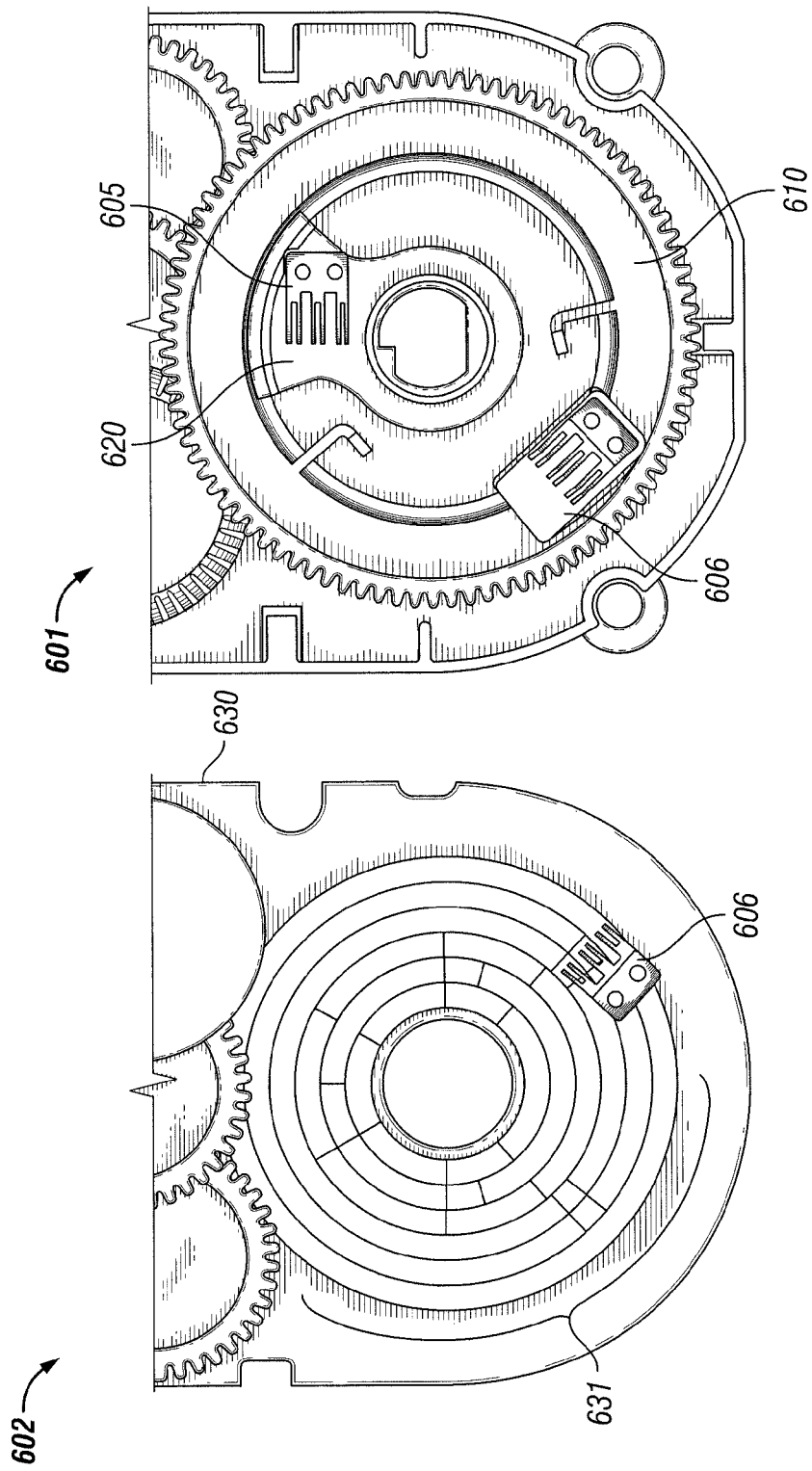
FIG. 25 illustrates exemplary position sensing components of an electromechanical lock.

With reference to FIG. 25 there are illustrated exemplary position sensing components 601 and 602 of an electromechanical lock. Components 601 include main gear 610, cam 620, and wiper contacts 605 and 606. Main gear 610 and cam 620 may be of the type illustrated and described above and are rotatable relative to printed circuit board ("PCB") 630 about a substantially common central axis. Wiper contacts 605 are coupled with cam 620 and rotatable therewith. Wiper contacts 606 are coupled with main gear 610 and rotatable therewith. Components 602 include PCB 630, and conductive traces 631 provided on PCB 630. It shall be appreciated that additional and alternate components may also be involved in position sensing in various embodiments.

Conductive traces 631 may be formed of various conductive materials using a number of techniques. In certain forms conductive traces 631 are gold or a gold alloy and can be provided using several different techniques. One exemplary technique is immersion gold plating which is a chemical deposition process for placing gold on PCB 630. Another exemplary production technique is flash plating. A third exemplary production technique is electroplating. Certain exemplary embodiments use carbon ink to provide conductive traces 631. A preferred carbon ink includes 21.7 percent phenolic resin, 18.5 percent epoxy resin modified, 15.8 percent carbitol acetate, 11.1 percent napbon, 30.6 percent carbon powder and 2.3 percent defoamer. Carbon ink may be applied to PCB 630 using jet printing or other techniques.

FIG. 25 illustrates components 601 and 602 in a separated configuration. When assembled in an electromechanical lock, conductive traces 631 are provided on the surface of PCB 630 facing main gear 610 and cam 620. Wiper contacts 605 and 606 are coupled to main gear 610 and cam 620, respectively, and are positioned facing PCB 630 and conductive traces 631. In an assembled configuration, wiper contacts 605 and 606 may come into contact with various different conductive traces depending upon the rotational positioning of main gear 610 and cam 620 relative to PCB 630.

Figure 26:
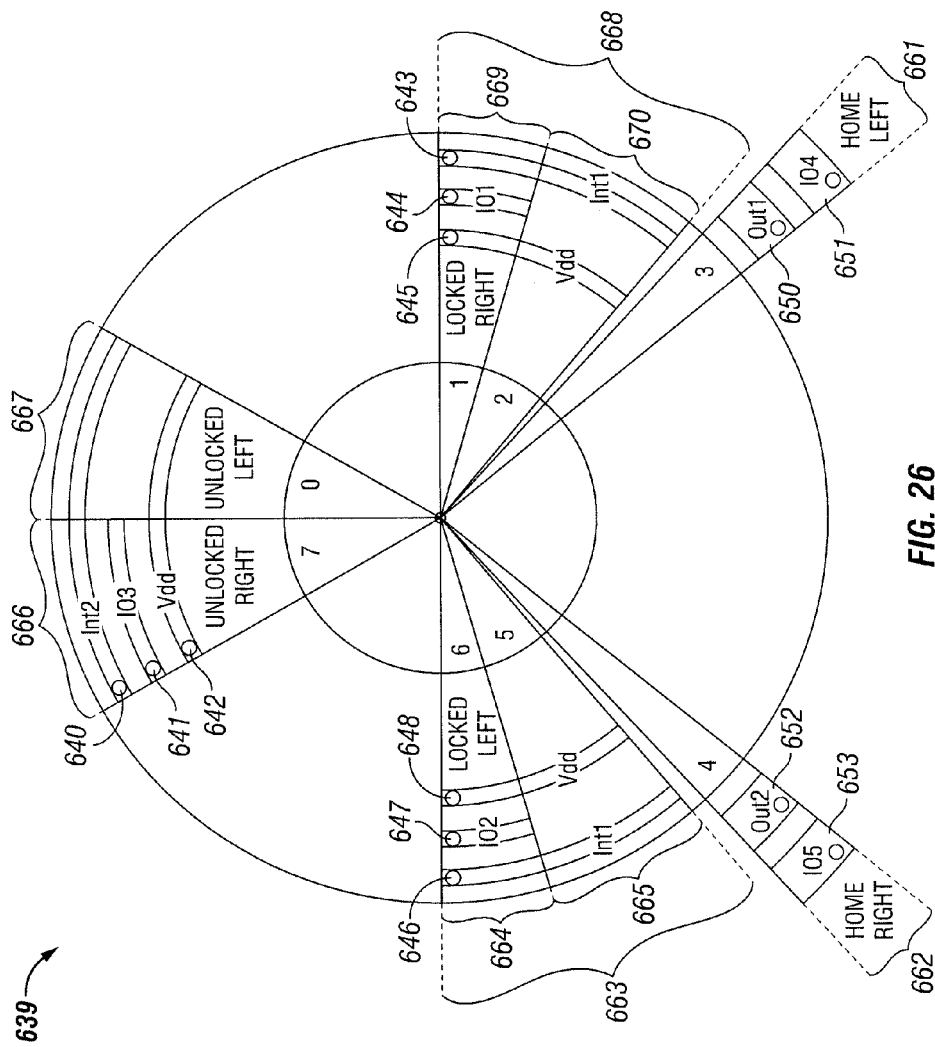
FIG. 26 illustrates an exemplary position sensing encoder of an electromechanical lock.

With reference to FIG. 26 there is illustrated an exemplary subset of conductive traces 631 which are utilized in position sensing in accordance with certain exemplary embodiments. The view of FIG. 26 is of the back side of conductive traces 631 which is the side that contacts the PCB as this view depicts left and right hand encoder features on the left and rights sides of FIG. 26, respectively, rather than the reverse. Conductive traces 640-649 and 650-653 may be provided on a PCB such as PCB 630 in electrical communication with electronics provided on the PCB. When wiper contacts 605 come into contact with two or more of conductive traces 640-648, a closed circuit is provided therebetween. When wiper contacts 606 come into contact with two or more of conductive traces 650-653 a closed circuit is provided therebetween. The electronics provided on PCB 630 perform electrical interrogation or polling of conductive traces 640-648 and 650-653 to identify open and closed circuits conditions of the various circuits defined therebetween. The open and closed circuit information may in turn be utilized to determine the position of a locking mechanism such as a deadbolt to which cam 620 is drivingly coupled, whether the mechanism was last actuated mechanically or electronically, and to provide auto-handing functionality for set up and configuration of electromechanical locks among other functionalities.

The exemplary encoder 639 illustrated in FIG. 26 comprises a subset of conductive traces 631 which can be utilized to provide a deadbolt position sensing mechanism for an electronic door locking mechanism, such as a deadbolt, which has the capability to be extended and retracted automatically by an electric motor integrated into the lock. The lock user also has the capability of utilizing an auto throw deadbolt feature both locally at the lock and remotely through internet connectivity as well as the option of manually extending and retracting the deadbolt from the inside of the door with a turn knob, and/or outside the door with a key. Exemplary systems may utilize encoder 639 to provide locked position sensing, unlocked position sensing, as well as autohanding of the lock upon installation. Such systems may utilize encoder 639 in connection with providing real time deadbolt position sensing and reporting capabilities, and reporting successful and unsuccessful deadbolt extension or retraction no matter the method used to change the state of the deadbolt (electronically or manually). Encoder 639 can also be utilized to determine whether the door lock was last actuated manually or electronically.

Locked position sensing may be performed using the subset of conductive traces 631 illustrated in FIG. 26 which are operatively coupled to pins of a microcontroller. Conductive traces 642, 645 and 648 are connected to voltage supply pin Vdd. Conductive trace 644 is connected to input/output pin IO1. Conductive trace 641 is connected to input/output pin IO3. Conductive trace 647 is connected to input/output pin IO2. Conductive trace 646 is connected to interrupt pin Int1. Conductive trace 640 is connected to interrupt pin Int2. Conductive trace 643 is connected to interrupt pin Int1. Conductive trace 650 is connected to input pin IN1. Conductive trace 651 is connected to input/output pin IO4. Conductive trace 652 is connected to input pin IN2. Conductive trace 653 is connected to input/output pin IO5. Table 1 below lists the foregoing exemplary conductive traces and corresponding microcontroller pins for encoder 639.

TABLE 1

| Conductive Trace No. | Microcontroller Pin |
| --- | --- |
| 640 | Int2 |
| 641 | IO3 |
| 642 | Vdd |
| 643 | Int1 |
| 644 | IO1 |
| 645 | Vdd |
| 646 | Int3 |
| 647 | IO2 |
| 648 | Vdd |
| 650 | IN1 |
| 651 | IO4 |
| 652 | IN2 |
| 653 | IO5 |

Table 1

In some exemplary embodiments, conductive traces 642, 645 and 648 are connected to Vdd, conductive traces 653 and 651 are connected to a selected input pin of a microcontroller (thus making IO4 and IO5 a common pin), conductive traces 643 and 646 are connected to a common interrupt pin interrupt of the microcontroller (thus making Int1 and Int2 a common pin), conductive trace 640 is connected to another interrupt pin of the microcontroller, and the remaining conductive traces are connected to selected input pins of a microcontroller. In other exemplary embodiments three separate output and interrupts pins are utilized for conductive trace. It shall be understood that the various inputs and outputs may be configured such that current is drawn and power consumed only when polling.

Zone 663 of encoder 639 designates a locked left position of a locking mechanism such as a deadbolt, and zone 668 of encoder 639 designates a locked right position of the locking mechanism. An interrupt routine is utilized in connection with zones 663 and 668 in sensing the locked position. When wiper contact 605 is in zone 663 or 668 a circuit is closed between Vdd and pin Int1, pin Int1 is pulled high, and the microcontroller can determine that wiper contact 605 is in zone 663 or 668 and that the locking mechanism is in the locked position.

There are two sub-zones in the zones 663 or 668 which are distinguished by the microcontroller using conductive traces 644 and 647 which are connected to pins IO1 and IO2 respectively. Once the interrupt is triggered and Int1 is shorted to Vdd, the microcontroller will start polling and looking for a state change from pin IO1 or IO2 called LOCKED_ZONE. If pin IO1 or IO2 is pulled high, the microcontroller will know that the wiper contact 605 is in zone 664 or 669 and that deadbolt is in the guaranteed >X % extended region where X is a percentage extension defined as sufficient extension to be considered locked, though not necessarily 100 percent extended or dead locked. If pin IO1 or IO2 is pulled low, but the Int1 pin is pulled high, the microcontroller can determine that the wiper contact 605 is in zone 665 or 670 and that the lock is in the greater than a Y % probability that deadbolt is in a fully extended zone where Y is a probability that this state has been achieved.

The microcontroller may keep polling pins IO1 or IO2 until the state on that pin has settled out for at least a predetermined time period. Alternatively, a wait and poll after motor movement stops functionality may be utilized. The microcontroller will then issue a command to communication circuitry (such as a Z-Wave or other transceiver described in further detail herein below) to update the lock status once the state on pin IO1 or IO2 is stable. None of the pins pin Int1, IO1, and IO2 are pulled low, the lock is considered to be in a transition or unknown state (assuming it is not in the unlocked state). While not mandatory in all embodiments, the interrupt pins are utilized to ensure the microcontroller can pick-up a state change when the deadbolt moves into a locked zone. In embodiments without interrupt pin functionality, for example where a generic input/output pin is used, continuous polling is utilized to determine whether an encoder state change has occurred. Unless the wiper contacts 605 is in a steady state for greater than 3 ms, a control routine could not guarantee that the interrupt would be caught by the microcontroller. If this had happened, the transition area on the PCB without any PCB wiper traces would appear the same as the area where the probability of the deadbolt being extended fully is >Y %. This may be acceptable in certain embodiments, but not in others.

Conductive traces 643/646 and 645/648 may be provided as duplicate circuits wired in parallel for left and right handed locks, respectively. Only one set of circuits will be used depending on how the user mounts the lock on their door. In other forms separate circuits may be used. If the thumb turn is used to operate the lock, the user will get real time feedback of their locked status. If the motor is used to change the lock state, it will be possible to sense motor current and wait for the motor to reach a stall state. At this point, power will be removed from the motor and the lock will read the locked position in real time and report this back to the customer or to a security service provider. The motor will then be driven in the opposite direction to return the main gear to the home position. In embodiments which utilize a lost motion electromechanical system, such as those described herein, return to the home position can facilitate manual lock actuation while avoiding or minimizing back driving a gear train and/or motor.

Unlocked position sensing may be performed using encoder 639. For unlocked position sensing, there is a need to differentiate between unlocked left and unlocked right. Due to tolerance stack-ups for the unlocked state there is a certain tolerance range. In certain embodiments the tolerance range was determined to be 30 degrees; i.e., the deadbolt cam should end up between 0 and 30 degrees from vertical for the deadbolt to be considered unlocked. The lock will report successful unlock anywhere in this range. It is possible that the deadbolt could still be partially extended into the door and the lock would report a successful unlock. However, this is unlikely because of the spring back action of the deadbolt. Use of a tapered deadbolt can further mitigate this possibility. Due to the taper, as the deadbolt retracts, the side load force from the door on the deadbolt is reduced. It shall be appreciated that the ranges disclosed herein are exemplary and that other embodiments may have unlocked regions that are defined by different ranges.

Schematically, the implementation of sensing the unlocked state is similar to that of the locked state. The lock needs to be able to differentiate 2 regions within an unlocked zone to know if the lock has driven the deadbolt far enough back into the door to report a successful unlock. If the lock is left handed, it will pass by the right handed unlocked zone 666 before reaching the correct left handed unlocked zone 669 and it will need to be able to tell the difference between these zones. An interrupt routine is utilized to accomplish this sensing. Conductive trace 640 is connected to pin Int2. Conductive trace 642 is connected to voltage supply Vdd. As conductive trace 640 is shorted to conductive trace 642 by wiper contacts 605, the interrupt will edge trigger and change states. This will tell the lock that it is in the unlocked zone.

There are two distinct states in each of unlocked zones 666 and 667 that are differentiated using conductive trace 641. After an interrupt is triggered through closed circuit between conductive traces 640 and 642, the microcontroller may poll and look for a state change from pin IO3. In some forms a delay and then poll operation is utilized to ensure that a steady state has been achieved for the polling operation. In some forms the lock controller will wait until it detects a motor stall event, further wait an additional predetermined interval, and then poll the encoder to determine its position. If pin IO3 is pulled high and pin Int2 is pulled high, the microcontroller can determine that the deadbolt is in the unlocked right handed zone 666. If pin IO3 is pulled low and pin Int2 is pulled high, the microcontroller can determine that the lock is in the unlocked left handed zone 667.

The microcontroller will continue polling pin IO3 once its state has been settled for at least a predetermined time. The microcontroller will then issue a command to communication circuitry (such as a Z-Wave or other transceiver described in further detail herein below) to update the lock status once the state of pin IO3 is stable. For a left handed lock, the wiper contact must make it back to the left handed region for a successful unlock to be reported. For a right handed lock, the wiper contact must make it back to the right handed region for a successful unlock to be reported. If neither the interrupt pin nor the IO3 pin on the microcontroller is pulled low, the lock is considered to be in a transition or unknown state (assuming it is not in the locked state). If the thumb turn is used to operate the lock, the user will get real time feedback of their locked status. If the motor is used to change the lock state, it will be possible to sense motor current and wait for the motor to reach a stall state. At this point, the rotor returns to the home position and a polling while moving operation is performed to detect a home position signal from zone 661 or 662. Alternatively, in some forms, power will be removed from the motor and the lock will read the locked position in real time and report this back to the user. The motor will then be driven in the opposite direction to return the main gear to the home position.

Lock autohanding may be performed using encoder 639. In order to accomplish autohanding, during lock initialization, the lock will look to see if the IO3 pin is pulled high or low before the motor starts to turn. If the switch starts high and is pulled low, the lock is left handed. If the switch starts low and is pulled high as the lock locks the lock is right handed. This is just one of a number of ways to automatically determine lock handing. The above routine is suitable for some applications, however it is susceptible to the possibility that error may arise due to the ability of the lock to be unlocked but not in the proper unlocked right/left zone or the possibility that the lock incorrectly assumes it is starting from a fully open state.

An additional manner of determining lock handing involves sensing an initial position of a locking mechanism, controlling the motor to apply force to the locking mechanism in a first direction, monitoring the motor for a stall characteristic, such as a stall current magnitude, upon detection of the stall characteristic, sensing the stall position of a locking mechanism, and determining whether the electromechanical door lock is installed in the left hand configuration or the right hand configuration based upon the initial position and the stall position. If an unknown region is detected, the lock may reverse direction and repeat the process until a stall is detected in a known state. This algorithm accounts for the possibility that the autohanding operation may not commence with the lock in the fully closed position, and could commence with the lock in the fully open position or another position which presents the possibility of an incorrect handing determination.

Main gear position sensing may be performed using encoder 639. As wiper contact 606 rotates with main gear 610, it may travel into zones 661 and 662 and close a circuit that can be used to sense the home position for the main gear 610. Depending on whether the lock is right handed or left handed, either traces 650 and 651, or traces 652 and 653 will be utilized for home position sensing. The circuits of zones 661 and 662 will change state only when the main gear is actuated. In certain exemplary embodiments during an electrical lock or unlock event, a polling routine without interrupts may be utilized. A microcontroller pin IO4 provides a periodic input voltage to conductive trace 651. A microcontroller pin IO5 provides an input voltage to conductive trace 653. It shall be appreciated that pins IO4 and IO5 may comprise a single, common pin of a microcontroller. As the circuits of zones 661 and 662 will frequently be closed this is preferred to providing a constant voltage source Vdd that would continuously draw current. This is also unnecessary as the main gear typically does not move if not driven by the motor.

After the bolt reaches its new (locked or unlocked) position, polling is performed while the main gear is controlled to return to a home position. Pins IO4 or IO5 are periodically polled by a microcontroller during an electrical unlock. Conductive trace 650 is connected to pin IN1 and conductive trace 652 is connected to pin IN2. Pins IN1 and IN2 will be pulled low until the wiper contacts 606 closes the circuit of zones 661 and 662, respectively, and the microprocessor polls pin IO4 or IO5 respectively. At this point, the pin IN1 or pin IN2 will be pulled high and the microcontroller will know to remove power from the motor because the main gear 610 has returned to its home position. It shall be appreciated that the functionalities and connection of traces 650 and 651 could be reversed in some embodiments, as could those of traces 652 and 653. It shall further be appreciated that a variety of alternate and additional trace configurations and pin connections can be used in other embodiments.

The main gear 610 will need to return to its home position after every lock and unlock cycle. This means a control routine provided in a computer readable memory associated with the microcontroller and executable by the microcontroller will have to first drive the deadbolt to the commanded state. Once a control routine receives confirmation that the deadbolt reaches the commanded state, for example by detecting a motor stall indication, a control routine will need to drive the main gear back in the opposite direction until it reaches its home position. Returning the main gear 610 to the home position avoids the possibility of the user back driving the motor when the deadbolt is operated using the thumb turn. It should also be appreciated that certain embodiments may utilize an autohanding control routine using this approach instead of the approach described above.

Figure 27:
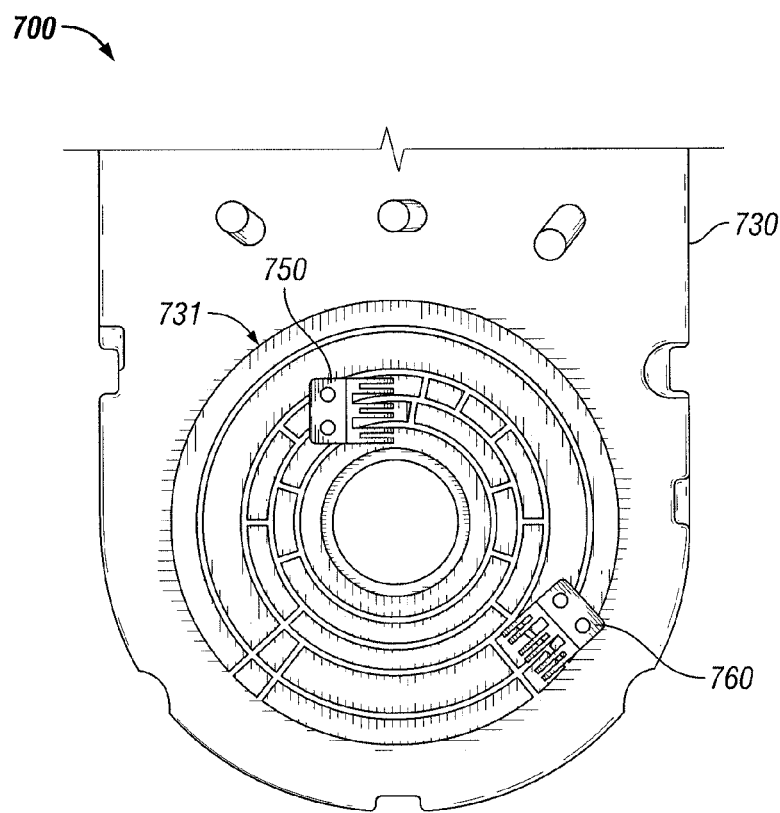
FIG. 27 illustrates additional exemplary position sensing components of an electromechanical lock.

With reference to FIG. 27 there are illustrated exemplary position sensing components 700 of an electromechanical lock. Components 700 include PCB 730, conductive traces 731 provided on PCB 730, and wiper contacts 750 and 760. While not illustrated in FIG. 27, it shall be appreciated that wiper contacts 750 and 760 may be coupled with a cam and a main gear, respectively, and are rotatable therewith relative to conductive traces 731. It shall be further appreciated that additional and alternate components may also be involved in position sensing in various embodiments.

Figure 28:
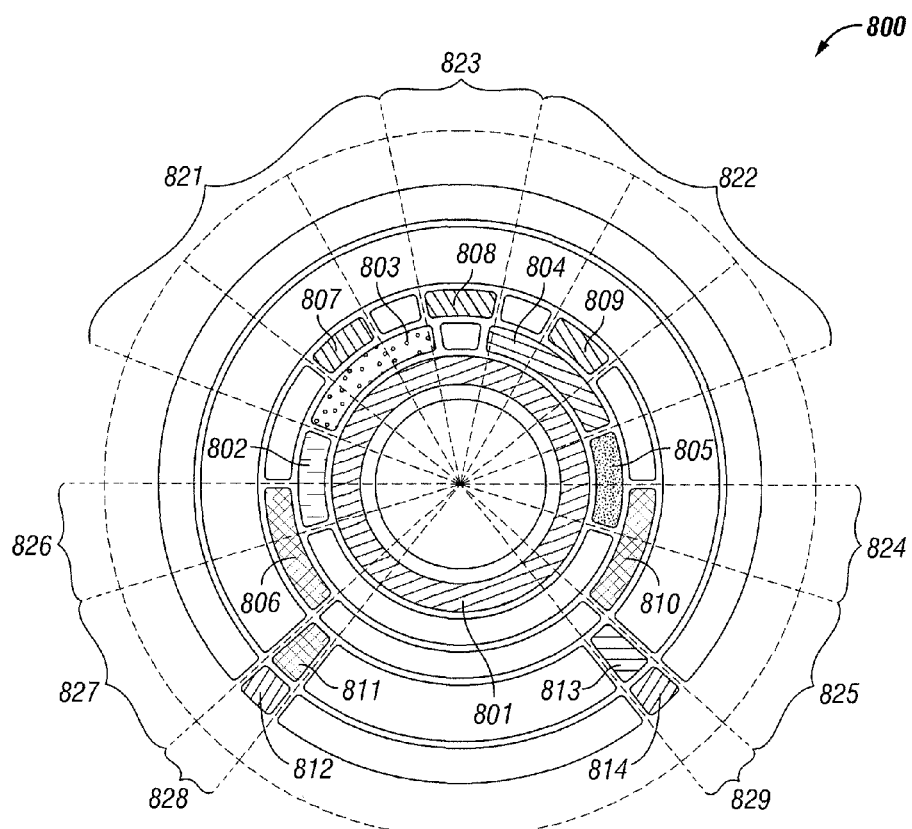
FIG. 28 illustrates an additional exemplary position sensing encoder of an electromechanical lock

With reference to FIG. 28 there is illustrated an exemplary encoder 800 that may be utilized in connection with position sensing components such as those disclosed hereinabove. Encoder 800 may be utilized as an alternative to encoder 639 and may be configured relative to other position sensing components in a substantially similar manner as that illustrated in FIG. 25. The alternatives and modifications described in connection with encoder 700 may also apply to encoder 800 configurations and vice versa.

Encoder 800 includes conductive traces 801-814 which are in electrical communication with various input/output and interrupt pins of a microcontroller or other control circuitry. Exemplary connections are set forth in Table 2 below, though it shall be understood that a variety of additional or alternate relationship between conductive traces and controller pins may be utilized.

TABLE 2

| Conductive Trace No. | Controller Pin |
| --- | --- |
| 801 | VDD |
| 802 | GPIO RH6 |
| 803 | GPIO RH7 |
| 804 | GPIO RG0 |
| 805 | GPIO RG3 |
| 806 | Interrupt RB4 |
| 807 | Interrupt RB5 |
| 808 | Interrupt RB5 |
| 809 | Interrupt RB5 |
| 810 | Interrupt RB4 |
| 811 | GPIO RA1 |
| 812 | GND |
| 813 | GPIO RF7 |
| 814 | GND |

Table 2

Encoder 800 utilizes regions 821-829 for position sensing. Conductive traces 801-814 may come into contact with wiper contacts to define different circuits within regions 821-829. The remaining conductive traces (not numbered) may be, but need not be connected to other electronics but are nevertheless preferably present to promote the wipers staying level when rotating, mitigate potential scraping, and maintain the wiper contacts at substantially the same degree of contact at various positions.

As a wiper contact rotates due to actuation of lock mechanism, it contacts different combinations of conductive traces 801-810 and provides a plurality of different open and closed circuits which encode lock mechanism position information. A wiper contact in region 821 establishes a closed circuit between conductive traces 801 and 803. This closed circuit encodes an almost unlocked right state for locks with right handing and a fully unlocked left state for locks with left handing.

A wiper contact in region 822 establishes a closed circuit between conductive traces 804 and 809. This closed circuit encodes an almost unlocked left position for locks with left handing and a fully unlocked position for locks with right handing. In this position a left handed lock it is not considered unlocked, while a right handed lock is considered unlocked A wiper contact in region 823 establishes a closed circuit between conductive traces 801 and 808. This closed circuit encodes a fully unlocked position for both locks with left handing and locks with right handing.

A wiper contact in region 824 establishes a closed circuit between conductive traces 801, 805 and 810. This closed circuit encodes an almost locked position for locks with left handing. A wiper contact in region 825 establishes a closed circuit between conductive traces 801 and 810. This closed circuit encodes the dead latched position for locks with left handing.

A wiper contact in region 826 establishes a closed circuit between conductive traces 801, 802 and 806. This closed circuit encodes an almost locked position for locks with right handing. A wiper contact in region 827 establishes a closed circuit between conductive traces 801 and 806. This closed circuit encodes the dead latched position for locks with right handing.

A wiper contact in region 828 establishes a closed circuit between conductive traces 811 and 812. This closed circuit encodes the main gear home left position. A wiper contact in region 829 establishes a closed circuit between conductive traces 813 and 814. This closed circuit encodes the main gear home right position.

In addition to the exemplary embodiments described above, it shall be appreciated that a number of additional and alternate arrangements and configurations of conductive traces may be utilized in various embodiments. For example, different numbers of conductive traces may be in electrical communication with microcontroller pins, the conductive traces may span different geometric ranges, provide different numbers of potential circuit connections, provide differently defined position regions, and/or be associated with different defined positions.

Figure 32:
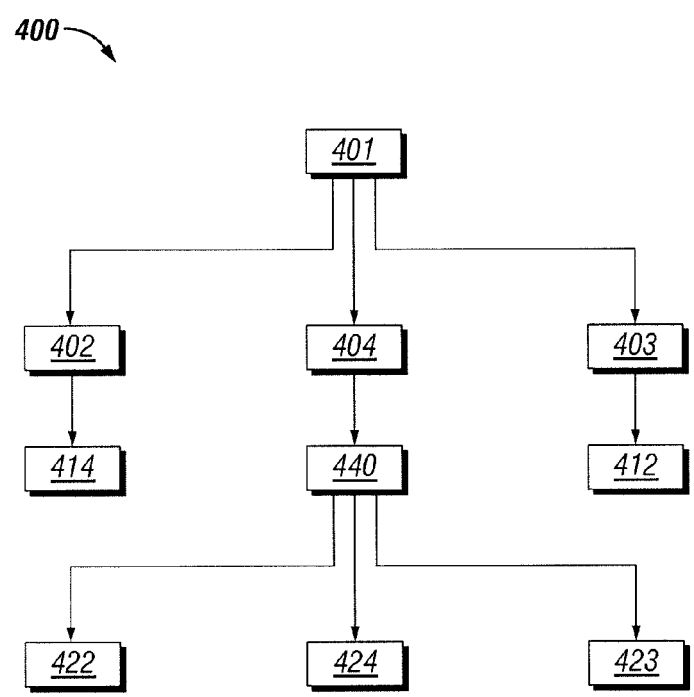
FIG. 32 is flow diagram according to an exemplary autohanding process.

With reference to FIG. 32 there is illustrated a flow diagram according to an exemplary autohanding process 400. In process 400, autohanding is performed using encoder 800 and a lost motion electronic-plus-manual actuation configuration such as the examples described herein. Process 400 is operable without assuming a known starting position, for example, where a microcontroller has not determined and may not be able to determine whether the lock is in a locked, unlocked, undefined or intermediate state. Process 400 starts at operation 401 where the lock powers up and queries encoder 800 to determine its state. Three possible state determinations may be made: locked, unlocked and unknown.

Block 402 indicates that a position signal in locked region 824 has been detected. If this is the case, process 400 proceeds to operation 414 where the lock is determined to have left handing since only a left handed lock may be positioned in this region. Block 403 indicates that a position signal in locked region 826 has been detected. If this is the case, process 400 proceeds to operation 412 where the lock is determined to have right handing since only a right handed lock may assume this position. It shall be appreciated that regions 825 and 827 may additionally or alternatively be used to make handing determination as they are also exclusive to left and right hand configurations, respectively. Limiting the determination process to regions 824 and 826 or other less than dead latched regions provides the additional ability to distinguish motor stall associated with dead latched positioning from true handing determinations.

Block 404 indicates that a position signal in any of unlocked regions 821-823 has been detected or that no signal has been detected indicating a position in an undefined position. In either case, process 400 proceeds to operation 440 where the locking mechanism is electrically actuated while polling for a signal indicating position in either region 824 or 826. Actuation continues until a signal indicating that locking mechanism is in one of regions 824 and 826 is detected or a motor stall indication is sensed.

Block 422 indicates that a position signal in locked region 824 was detected and the lock is determined to have left handing since only a left handed lock could assume this position. Block 423 indicates that a position signal in locked region 826 was detected and the lock is determined to have right handing since only a right handed lock could assume this position. Block 424 indicates that a motor stall was sensed without a signal from either region 824 or 826 being detected. In this case the locking mechanism may be rotated in the opposite direction and the polling process repeated. Alternatively, after one or more stall event(s), an error state may be determined and an error signal may be provided to the user.

If the position state is undefined the locking mechanism may need to be actuated several times to determine handing. Thus, if there is an undefined initial state, the lock may defer making an error state determination until two or more motor stalls are sensed. The number of reverse and repeat polling attempts may also be defined to be greater than one regardless of the initial state determination. It shall be appreciated that this is preferred for at least the undefined initial position since there are multiple potential explanations for a motor stall being sensed without a signal from either region 824 or 826 being detected, and reverse and repeat polling functionality may reduce uncertainty as to the state causing motor stall and enhance autohanding performance. Additionally, it may be preferable to run process 400 this while the bolt is unobstructed, for example, with the door open, to ensure that any stalls are caused by end of travel and not other issues.

Figure 29:
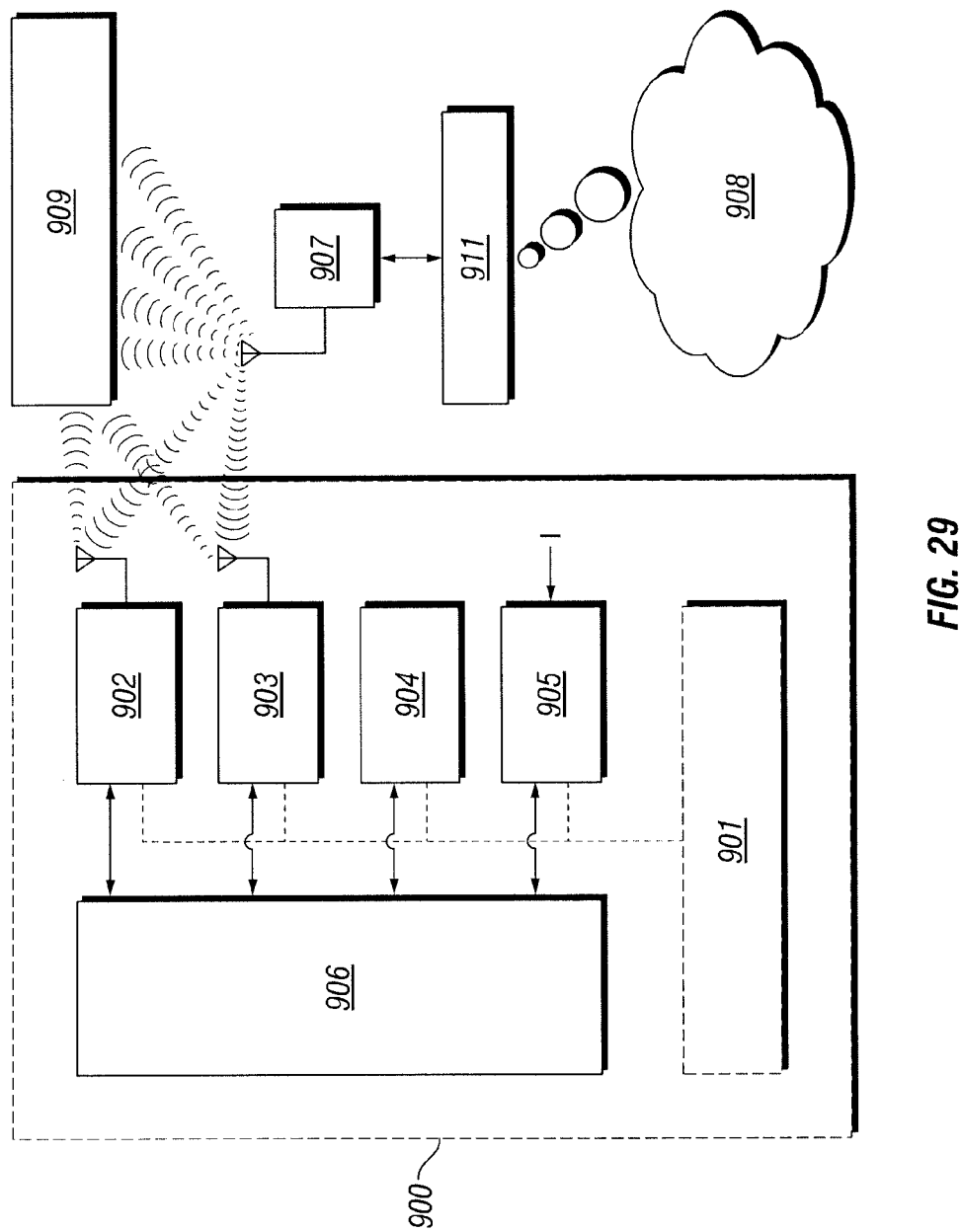
FIG. 29 illustrates an exemplary block diagram of certain electronics of a remotely operable electromechanical lock.

With reference to FIG. 29 there is illustrated exemplary circuitry 900 for a remotely operable electromechanical lock. Circuitry 900 includes power supply 901, transceiver 902, receiver 903, position sensing and motor control circuitry 904, user input circuitry 905, and controller 906. Power supply 901 is preferably a battery-based power supply and is coupled with and supplies electrical power to the other components of circuitry 900. Controller 906 is in communication with the other components of circuitry 900 and is operable to send and receive information and control signals therewith.

Transceiver 902 is operable to send and receive radio frequency signals on a specified channel in accordance with a specified communication protocol. In one exemplary form, transceiver 902 is configured according to the Z-Wave wireless communication standard which operates at about 908 MHz and is operable to send and receive Z-Wave compatible transmissions. It shall be appreciated, however, that additional and alternate communication channels and protocols may also be utilized.

Transceiver 902 is in operative communication with controller 906 and is controllable thereby. Controller 906 is operable to receive information demodulated by transceiver 902 and to provide information to transceiver 902 for modulation and transmission. Decoding of received, demodulated information and encoding of information to be modulated and transmitted may be performed by any of transceiver 902, controller 906, additional or alternate circuitry, or combinations thereof. Controller 906 is further operable to command transceiver 902 to enter sleep and wake modes. In wake mode, transceiver 902 is turned on and is operable to send and receive radio signals in accordance with a specified protocol. In sleep mode, transceiver 902 is substantially turned off, and draws reduced current and consumes less power from power supply 901 relative to wake mode. Preferably transceiver 902 draws substantially no current in sleep mode, for example, only current needed to facilitate and allow signal detection and transition to a wake mode, though in some embodiments some additional current draw associated with other functionalities may occur in sleep mode.

Receiver 903 is operable to receive the same radio frequency signals on the same specified channel utilized by transceiver 902. In some forms receiver 903 is operable to receive and demodulate signals in accordance with the same specified communication protocol utilized by transceiver 902. Receiver 903 is in operative communication with controller 906 and is controllable thereby. Receiver 903 is controlled by controller 906 to poll the specified channel for radio transmissions including one or more specified characteristics. Upon detection of a signal including the one or more specified characteristics, receiver 903 is operable to send a wake up request to controller 906. In some exemplary embodiments, specified characteristic is a received signal strength indication (RSSI) that is provided to the controller 906 or other processing circuitry for comparison with a threshold. In some embodiments the RSSI is compared to a threshold by receiver 903 or by receiver 903 in combination with other circuitry. Controller 906 is operable to receive and process the wake up request and send a wake command to transceiver 902. Upon receipt of a wake up request, transceiver 902 wakes and is operable to send and receive radio signals in accordance with a specified protocol.

Receiver 903 is configured to draw lower current and consume less power during polling operation than would be drawn or consumed if transceiver 902 were utilized to perform a polling operation. Controller 906 may also control receiver 903 to suspend its polling or enter a standby mode when transceiver 902 is awake in order to further mitigate current drain and power consumption. Additionally, controller 906 may itself enter a reduced power mode or sleep mode which provides reduced current drain and power consumption relative to full operation while maintaining the ability to control receiver 903 to periodically poll for a signal, and receive a wake up request from receiver 903 or other system components.

Receiver 903 may be provided with a number of signal identification functionalities. In some forms receiver 903 is operable to evaluate RSSI information and to send a wake request to controller 906 based upon an evaluation of the RSSI relative to one or more specified criteria, for example, evaluating signal strength on a specified channel to determine when a remote device or system is attempting to communicate with controller 906. In additional forms, receiver 903 is operable to evaluate information encoded by a received signal. The encoded information may include, for example, a transmission type identifier, a device ID, a key or credential, other types of identifying information, or combinations thereof. In certain forms the receiver is operable to detect a Z-Wave preamble and has the capacity to distinguish between a true Z-Wave signal and other signals that may be present in the Z-Wave communication band based upon detection of a Z-Wave preamble. This functionality may reduce the number of false wake up requests generated by the receiver 903.

In some forms receiver 903 is operable to detect a Z-Wave device ID and evaluate whether the Z-Wave communication is meant for controller 906 or another Z-Wave device. This may also mitigate the false wake up requests by receiver 903 due to other Z-Wave devices communicating on the same channel or network. In some forms receiver 903 is operable to receive a beam from one or more nodes of a dynamically configurable wireless network. Z-Wave networks are one example of a dynamically configurable wireless network. Z-Wave networks are mesh networks wherein each node or device on the network is operable to send and receive signals including control commands. When one device in a Z-Wave network wants to communicate with another, it transmits a signal though a network pathway that may include a plurality of nodes through which the signal is relayed to its intended recipient node. Utilization of intermediate nodes facilitates transmission of signals around transmission obstacles such as interfering structures or devices and radio dead spots. A master controller node may be used to dynamically control or optimize the transmission pathway to be utilized by other nodes to communicate with one another. The master controller may send a beam and receive a response and use this information to evaluate or optimize various network transmission pathways. A Z-Wave beam is a periodically transmitted sequence of bits that repeat for a predetermined duration. Certain bits in the repeating sequence includes a preamble to identify the transmission type as a Z-Wave transmission. Additional bits and an additional component that identifies node ID of the intended recipient may also be present in some forms. It shall be appreciated that additional information may, but need not be, included in a beam-type transmission.

In some exemplary embodiments transceiver 907 may be configured as a master controller node and receiver 903 may be configured as a transceiver. In such embodiments, communication to circuitry 900 may be initiated by transceiver 907 sending a beam that includes a device ID associated with circuitry 900 through a pathway of the dynamic network. Receiver 903 may then receive this transmission, identify it as a Z-Wave transmission, and identify that it is the intended recipient, initiate a wake up of transceiver 902 to receive a subsequent transmission, and transmit a response to transceiver 907 through a predetermined pathway indicating that the beam was received. The response may be provided to the master controller associated with transceiver 907 and used in connection with control, organization and optimization of the dynamic network.

In certain other embodiments, such as those where receiver 903 does not include transmission capability, the node ID associated with circuitry 900 may be utilized to further identify transceiver 907 as a potential sleeper, such as a FLiRS (frequently listening routing servant) node. Alternatively a separate potential sleeper identifier may be used. The potential sleeper identifier may be utilized by the master controller in controlling beam transmission and network configuration, operation and optimization. For example, the master controller may increase the duration of the beam or a subsequent transmission to account for the delay between the receipt of a beam by receiver 903 and the waking and transmission of a confirmation signal by transceiver 902. Additionally or alternatively the master controller or another node attempting to send a post-beam transmission may delay or otherwise change the timings of the transmission or may repeat or resend the transmission to account for wakeup delay. Additionally or alternatively, the master controller may account for potential delay by adjusting the time period or deadline within which it expects to receive the confirmation signal for transmissions of a beam or post-beam transmission to a potential sleeper node, and/or adjusting its control, configuration operation and optimization routines to account for the fact that it may not receive a response signal when expected. The master controller may also account for potential delay by sending duplicate transmission to account for the possibility that a sleeper node may be sleeping.

It shall be appreciated that decoding, processing and other functionalities disclosed herein may be performed by receiver 903, controller 906, additional or alternate circuitry, or combinations thereof. Additionally, it shall be appreciated that in some forms receiver 903 may be a transceiver also having the capability to transmit radio frequency signals on the specified channel and in accordance with the specified communication protocol utilized by transceiver 902. In some embodiments this transceiver may be operable to transmit a signal in response to a specified transmission in order to avoid the sending device from mistakenly concluding that its intended recipient is not operational. In some forms the response may include a request for retransmission of the same information so that it can be received by transceiver 902. Such functionalities may be used in connection with dynamic networks such as dynamically configurable networks whose operation and optimization depends upon receipt of responses and may be time sensitive.

Position sensing and motor control circuitry 904 is operable to sense the position of an electromechanical locking mechanism and to control a motor to actuate the locking mechanism. Circuitry 904 may include mechanical and electrical features described herein. Circuitry 904 is in operative communication with controller 906 and is operable to send information thereto and receive information therefrom.

User input circuitry 905 is operable to receive credentials input by a user, for example, from a keypad, touchpad, swipe card, proximity card, key FOB, RFID device, biometric sensor or other devices configured to provide an access credential that can be evaluated to determine whether or not to actuate a locking mechanism to provide or deny access to a user. Circuitry 905 is in operative communication with controller 906 and is operable to send information thereto and receive control signals and other information therefrom.

FIG. 29 further illustrates a remote transceiver 907 which is operable to transmit and receive information on the same specified channel and using the same specified communications protocol as transceiver 902 and receiver 903. Remote transceiver 907 is in operative communication with server 911 which is operable to send control signals and other information thereto and receive information therefrom. Server 911 is connected to and provides communication with network 908 which may include a local area network, wide area network, the internet, other communication networks, or combinations thereof. Remote transceiver 907 is operable to communicate with at least transceiver 902 and receiver 903, and may also communicate with one or more additional networked devices 909 which may themselves communicate with transceiver 902 or receiver 903.

In some exemplary embodiments communication between transceiver 902, transceiver 903, transceiver 907, and/or networked devices 909 may occur over a dynamically configurable wireless network. Certain exemplary embodiments enhance performance and compatibility of sleep/wake transceiver systems and dynamically configurable wireless networks by providing configuring transceiver 902 to receive a first signal transmitted by a control node of a dynamic wireless network, such as transceiver 907. The first signal may include an intended recipient ID. Transceiver 902 may be operable to demodulate the first signal and provide the intended recipient ID to controller 906. Controller 906 may be operable to evaluate the intended recipient ID and selectably control transceiver 902 to transmit an acknowledgment signal based upon this evaluation. This acknowledgement signal can be received by transceiver 907 and provided to server 911 for use in controlling, maintaining or optimizing a dynamic wireless network such as a dynamically configurable wireless network. The acknowledgment signal sent by transceiver 902 upon receipt of a signal from a control node may include an information retransmission request. The retransmission request may be received by transceiver 907 and provided to server 911 for use in providing information to transceiver 903. In some forms the retransmission request may be a request to transmit substantially the same information to transceiver 903 as was transmitted to transceiver 902. In some forms the retransmission request may be a request to transmit additional or different information to transceiver 903 than was transmitted to transceiver 902.

Transceiver 903 may be configured to wake up in response to a wake up command from the controller which may be triggered by a wake up request sent to controller 906 from transceiver 902. In some forms the transmission of the intended recipient ID may serve as a wake up request. In other forms other signals may be used. Once awake, transceiver 903 may receive a second radio signal from the control node of the dynamic wireless network. The second signal may include door lock access information. Transceiver 903 may be operable to demodulate the second signal and provide the door lock access information to controller 906 which can evaluate the door lock access information and command actuation of a locking mechanism such as those described herein based upon the evaluation.

Alternatively or additionally, the second signal may include door lock query information that may be demodulated by transceiver 903, provided to controller 906 and used to sense information of a locking mechanism position. Controller 906 may be further operable to control transceiver 903 to transmit this locking mechanism position information which can be received by other nodes of the network, such as transceiver 907, and provided to server 911 or other designated destinations. A number of types of information of a locking mechanism position may be sensed including the position of the locking mechanism such as a deadbolt in accordance with the position sensing devices and techniques disclosed herein. Additionally, some embodiments may determine whether a locking mechanism was last actuated manually or automatically.

Some exemplary dynamic network embodiments may include further features which will now be described. The signal received by transceiver 902 and the signal received by transceiver 903 may be transmitted on the same channel such as on the same frequency or band, may conform to the same transmission protocol, may include substantially the same information, may differ in their informational content only with respect to information pertaining to transmission time or transmission ID, and/or the two signals may be substantially identical. Either or both signals may include door lock access information, intended recipient information and/or other information. Either or both signals may be encrypted and encoded in various manners.

Some exemplary dynamic network embodiments may include additional features. Transceivers 902 and 903 may share a common antenna or may utilize separate antennas. Transceiver 902 and controller 906 may be operable to first evaluate the strength of a radio signal relative to a first criterion, such as a received signal strength indication, and second evaluate the intended recipient ID based upon said the first evaluation. Controller 906 may control transceiver 902 to periodically poll for a first signal while transceiver 903 is asleep, and control transceiver 903 to periodically poll for a signal when awake. Transceiver 902 may draws less current when periodically polling than transceiver 903 when periodically polling. Controller 906 may be operable to sense locking mechanism position information and control a locking mechanism in accordance with one or more of the techniques disclosed herein or alternate or additional techniques.

Figure 30:
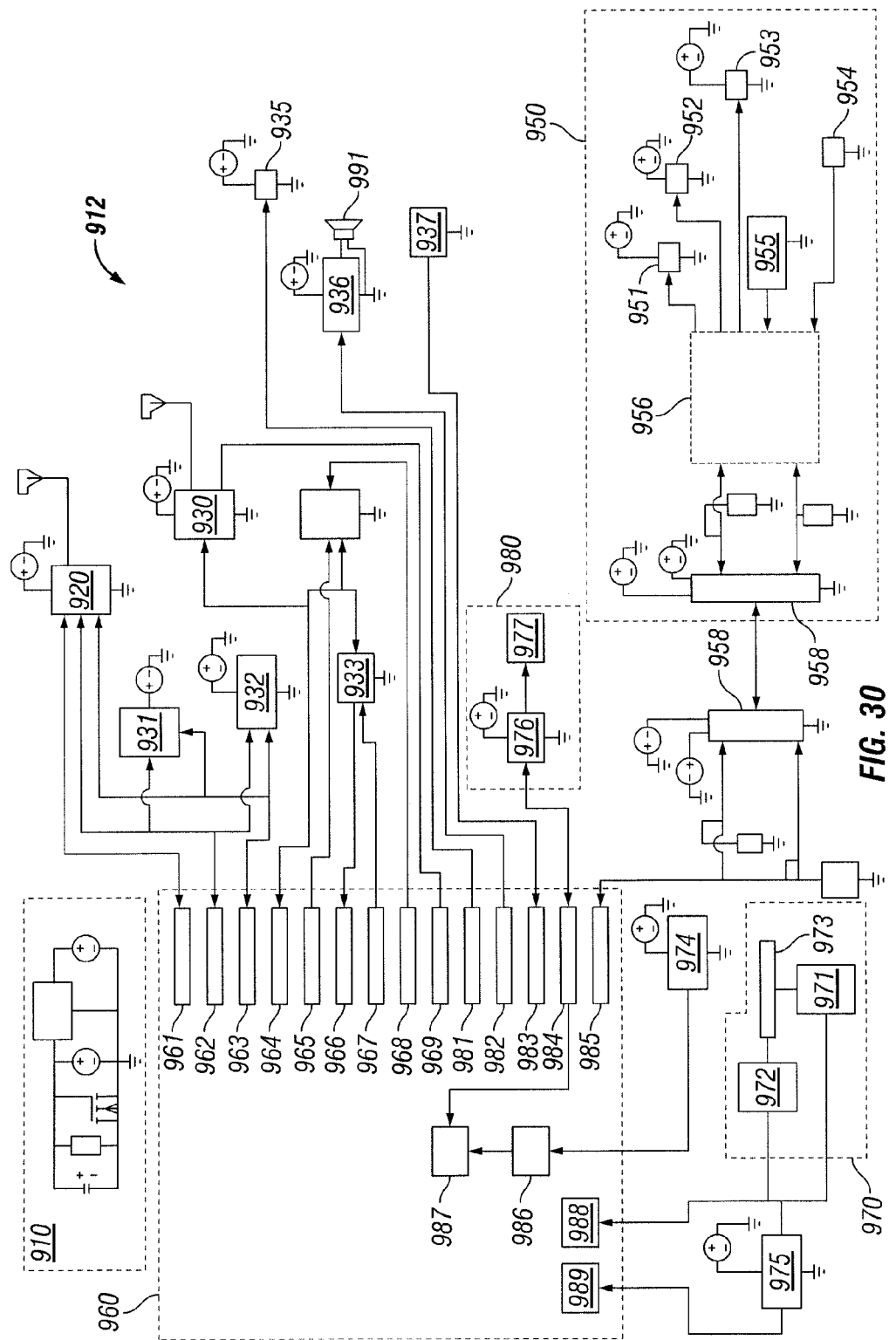
FIG. 30 illustrates an additional exemplary block diagram of certain electronics of a remotely operable electromechanical lock.

With reference to FIG. 30, there is illustrated exemplary circuitry 912 for a remotely operable electromechanical lock. Circuitry 912 includes power supply 910, Z-Wave transceiver 920, FOB transceiver 930, user input circuitry 950, microcontroller 960, position sensing circuitry 970, and motor control circuitry 980. Power supply 910 is a battery-based power supply and is operably connected to the other components of circuitry 912 to provide power thereto. Z-Wave transceiver 920 is connected to blocks 961, 962 and 963 of microcontroller 960. Block 961 is a universal asynchronous receiver/transmitter input. Block 962 is a serial peripheral interface input. Block 963 is a multi-channel Z-Wave input/output block. Block 962 is also connected to EEPROM 931 and Z-Wave programming connector 932. Block 963 is also connected to Z-Wave programming connector 932. Chip select and reset signals may be connected to programming connector 932 and may be used if the main microcontroller needs to reprogram Z-Wave transceiver 920.

FOB transceiver 930 is connected to block 964 of microcontroller 960 which may include a number of pins that form an SPI interface, for example, data in, data out and clock. A chip select line may also be used to select the chip on the device that a main controller will communicate with, for example, the accelerometer or the flash. Each device may share the SPI interface or may have a separate chip select line. Block 964 is a serial peripheral interface bus input. FOB transceiver 930 is also connected to shock vibration sensor 933, which is in turn connected to inputs 966 and 967 of microcontroller 960. Block 966 is an accelerometer interrupt input. Block 967 is an accelerometer power supply. The shock vibration sensor 933 includes an accelerometer and is used to detect impacts of vibrations that may be associated with inappropriate activity on the door. These may include, for example, tampering or attempted forced entry.

FOB transceiver 930 is also connected to block 969 of microcontroller 960 which includes an FOB transceiver input/output. Motor control circuitry 980 is connected to block 984 of microcontroller 960 which is a motor control input/output. Motor control circuitry 980 includes a motor controller 976 and motor connector 980. Flash memory 934 is connected to flash power 965 EEPROM input/output 968, shock vibration sensor 933, and transceiver 930. Motor control circuit may be used to drive an auto-throwable deadbolt or other door locking mechanism. Additionally the microcontroller 960 is operable to monitor the current drawn by the motor drive circuit to determine when a stall condition of the motor exists.

Microcontroller block 981 is an LED control input/output that is operatively connected to LEDs 935. Microcontroller block 982 is an alarm control input/output that is operatively connected to alarm control 936 which is in turn operatively connected to and is operable to control alarm 991. Block 983 of microcontroller 960 is a tamper push button input/output which is operatively connected to tamper push button 937 that is configured or positioned internal to the electromechanical door lock and operable to indicate when tampering is occurring. Block 989 of microcontroller 960 is a programming input/output and is operably connected to programming connector 975. Programming connector 975 is operable to interface with an external user block to program microcontroller 960. Block 988 of microcontroller 960 is an external sensor input/output and is operably connected to circuitry 970. Circuitry 970 includes motor and gear home position sensors 972, thumbturn and cam position sensors 971 and wiper contact switches 973 which may be provided in one or more of the encoder configurations described hereinabove or other encoder configurations.

Microcontroller block 986 is a battery voltage input and is connected to analog to digital converter 987 within microcontroller 978 and externally to battery voltage monitoring circuit 974. Battery monitor circuit 974 is used to measure the battery level and indicate to the user when battery is in need of replacement. The circuit is actuated by taking a signal check battery high which turns on an N-channel FET. The N-channel FET then pulls the gate of a P channel FET low allowing current to flow through a voltage divider circuit where the battery value line is input to an analog to digital converter. This saves the current consumption of the voltage divider when the battery voltage is not being measured. This operation may take place periodically, for example, about once every day.

Microcontroller block 985 is a universal asynchronous receiver transmitter input/output and is operably connected to through-door connector 958. Through-door connector 958 includes a positive battery line, a positive regulated 3V line, a ground line, a UART-TX line, and a UART-RX line. Through-door connector is operably coupled to microprocessor 956. Microprocessor 956 is connected to LEDs 951, 952 and 953 as well as to user inputs 954 and 955. In some exemplary embodiments, user input 954 is a 10-target keypad array and user input 955 is a push button input. It is also contemplated that additional and alternate user inputs such as those described herein may be utilized.

Figure 31:
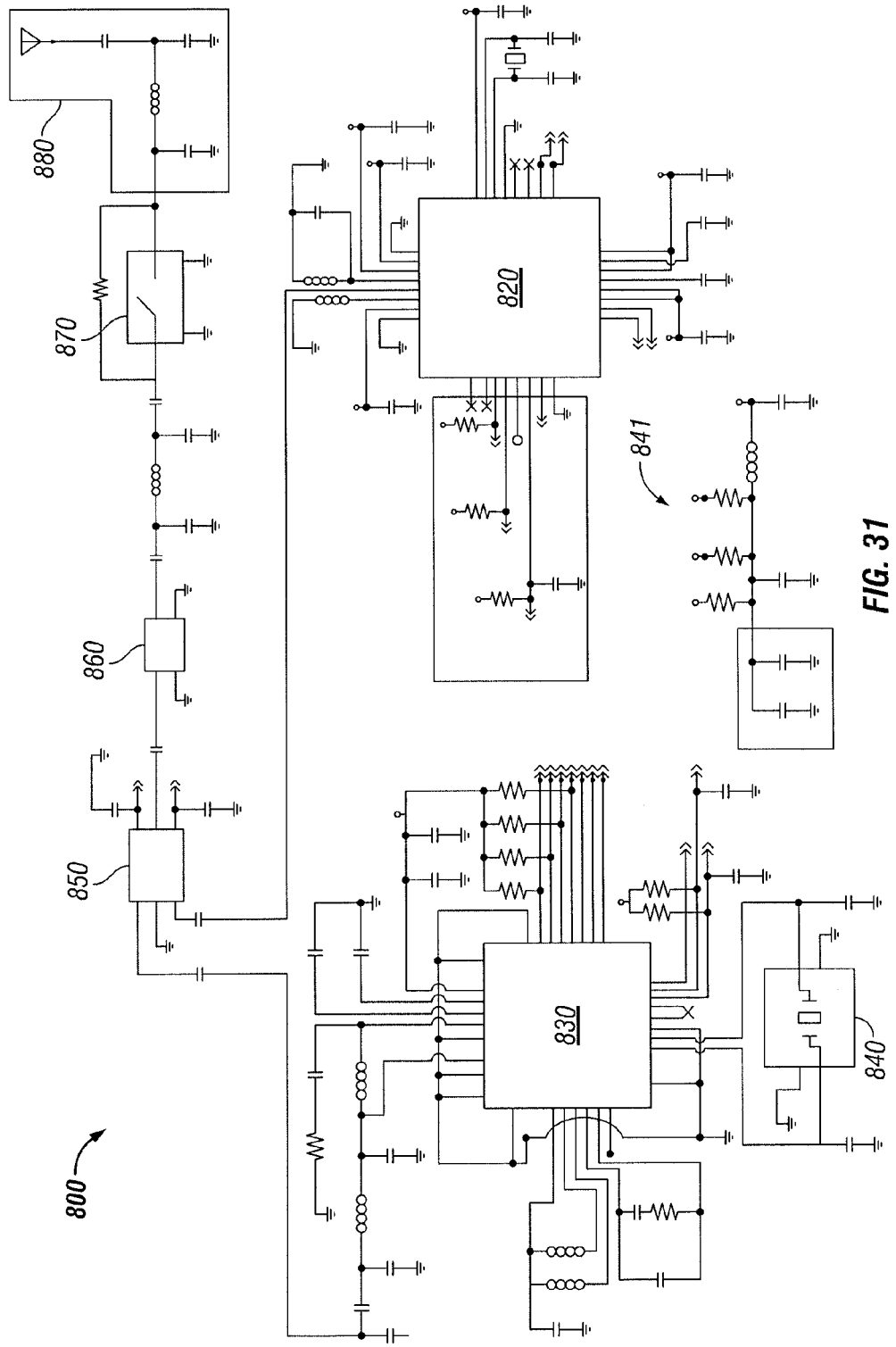
FIG. 31 illustrates a further exemplary circuit schematic for certain electronics of a remotely operable electromechanical lock.

With reference to FIG. 31 there is illustrated exemplary circuitry 800 for a remotely operable electromechanical lock. Circuitry 800 includes Z-Wave antenna circuitry 880 which is configured to receive signals on a frequency and channel of a Z-Wave transmission. Z-Wave antenna circuitry 880 is operatively connected to switch 870 which may be used for antenna tuning and may be bypassed with a capacitor or resistor for production. Switch 870 is operatively connected to SAW band pass filter 860 which is operatively connected to switch 850. Switch 850 is operable to connect and disconnect Z-Wave antenna, Z-Wave chipset 820, FOB transceiver 830 and other components associated with circuitry 800. An impedance matching network is also provided between antenna 880 and switch 850. Z-Wave chipset 820 and FOB transceiver 830 are both implemented as discrete layouts in the illustrated embodiment however it should be understood that module based implementations are also contemplated.

Circuitry 800 is operable to reduce power consumption in current drain by an electromechanical door lock. Z-Wave chipset 820 is capable of operating to poll for a Z-Wave signal. For example, Z-Wave chipset 820 may wake every second and check for a Z-Wave signal. In doing so, Z-Wave chipset 820 will draw about 26 mA while polling. FOB transceiver 830 is a transceiver integrated circuit which is also operable to poll for a Z-Wave signal. In contrast to Z-Wave chipset 820, FOB transceiver 830 draws about 3 mA when polling. A microcontroller connected to FOB transceiver 830 and Z-Wave chipset 820 is operable to use their contrasting characteristics to save power and reduce current drain. According to one exemplary method, the microcontroller places Z-Wave chipset 820 in the sleep mode where it consumes reduced power, and controls FOB transceiver 830 to periodically poll for a Z-Wave signal. In one form, FOB transceiver 830 is controlled to poll for a signal on a 908 MHz channel about one time per second. After each polling FOB transceiver 830 sends an RSSI value to the microcontroller. The microcontroller analyzes the RSSI value as follows. If the RSSI value is below a predetermined threshold nothing happens. If the RSSI value is above a predetermined threshold the microcontroller wakes up the Z-Wave chipset 820. After being awakened the Z-Wave chipset 820 checks for a Z-Wave communication. If there is no Z-Wave communication, the Z-Wave controller will go back to sleep in about 4 mS. If a Z-Wave communication was detected, the Z-Wave chipset will check the node ID. If the node ID is for a different device the Z-Wave chipset will go back to sleep. If the node ID equals the node ID of Z-Wave chipset 820, controller it will stay awake to receive packets.

Z-Wave transceiver 920 and FOB transceiver 830 are configured to detect a Z-Wave signal on the same communication channel at the same frequency. In various forms FOB transceiver 830 may have the capability of itself detecting and evaluating a Z-Wave preamble, node ID, and or other information encoded on a Z-Wave beam alone or in connection with a microcontroller or other circuitry. This may further reduce the number of false wakeup events where a Z-Wave signal is received but is not intended for a Z-Wave chipset 820.

As used herein, relative terms such as "top", "bottom", "right", "left", "side", etc. are used for ease of descriptive convenience only and are not meant to imply any type of limitation. For example, if an aspect of the application is disclosed as located on the "top" of a component, the location of that particular aspect can also be positioned elsewhere including the "bottom", "right", "left", "side", etc. unless indicated explicitly to the contrary.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus comprising:
an auto dead bolt door device having a first side key entry and a back side having a user grappling member;
a motor disposed internal to the device capable of providing torque useful in actuating a dead bolt of the auto dead bolt door device, the dead bolt having a retracted position, a dead position opposite the retracted position, and a plurality of extended positions between the retracted position and the dead position; and
a gearing system that includes a plurality of toothed members having corresponding intermeshed gear teeth disposed between the motor and the dead bolt and operable to convey torque from the motor to actuate the dead bolt, wherein a first of the plurality of toothed members is coupled directly to the motor, the plurality of toothed members having a cooperative configuration that permits backdriven operation to allow torque to be applied to move the plurality of toothed members in a first direction and an opposite second direction such that an array of gear teeth of the first toothed member is configured to be a driven gear and a driving gear depending upon a torque applied, wherein the first toothed member coupled directly to the motor comprises a pinion gear.

2. An apparatus comprising:
an auto dead bolt door device having a first side key entry' and a back side having a user grappling member;
a motor disposed internal to the device capable of providing torque useful in actuating a dead bolt of the auto dead bolt door device, the dead bolt having a retracted position, a dead position opposite the retracted position, and a plurality of extended positions between the retracted position and the dead position; and
a gearing system that includes a plurality of toothed members having corresponding intermeshed gear teeth disposed between the motor and the dead bolt and operable to convey torque from the motor to actuate the dead bolt, the plurality of toothed members having a cooperative configuration that permits torque to be applied to move the plurality of toothed members in a first direction and an opposite second direction such that an array of gear teeth of a first toothed member is configured to be a driven gear and a driving gear depending upon a torque applied; and
a loss motion coupling between a cam and first toothed member of the plurality of toothed members such that the loss motion permits the cam to rotate between a dead bolt retracted position and a dead bolt extended position.

3. The apparatus of claim 2, wherein the first toothed member includes a shoulder oriented to interact with the cam.

4. The apparatus of claim 3, which further includes a lost motion pocket formed in the first toothed member, the cam located in the lost motion pocket.

5. An apparatus comprising:
a deadbolt assembly having an internal motor in driving relation with a deadbolt a user grappling member interconnected to the deadbolt and configured to extend and retract the deadbolt without use of the motor;
gearing means for backdriving the motor when a failure occurs in the motor such that the deadbolt is placed in an intermediate position between a hilly extended position and a fully retracted position; and
means for permitting lost motion between a thumbturn and the motor such that the thumbturn can be rotated to open and close the deadbolt without corresponding motion in the motor.

6. An apparatus comprising:
a powered door access device module structured to operate a bolt that can be extended and retracted into a door jamb to secure a door, the device module also having a receptacle for receiving an energy storage device useful to provide power to a motor to extend and retract the bolt and a user grappling member useful to permit a user to extend and retract the bolt when the device module is coupled with a door and bolt assembly;
a reversible gear transmission disposed between the motor and the bolt of the door, the reversible gear transmission structured to be driven by the motor in one mode of operation to extend and retract the bolt, the reversible gear transmission also capable of receiving a movement from the user grappling member and transmitting that movement to the motor, wherein the reversible gear transmission includes a lost motion feature such that movement of the motor over a substantial range of throw of the bolt does not cause a corresponding movement in the bolt.

7. The apparatus of claim 6, wherein the motor is interconnected to the reversible gear transmission via a pinion and face gear.

8. The apparatus of claim 6, which further includes an electrically powered keypad structured to receive a pass code.

9. The apparatus of claim 6, wherein the gear transmission is in mechanical communication with a driver structured to be driven by one of the motor and the user grappling member.

10. The apparatus of claim 6, wherein the reversible gear transmission is arranged to permit backdriven operation of the motor.

11. An apparatus comprising:
a powered door access device module structured to operate a bolt that can be extended and retracted into a door jamb to secure a door, the device module also having a receptacle for receiving an energy storage device useful to provide power to a motor to extend and retract the bolt and a user grappling member useful to permit a user to extend and retract the bolt when the device module is coupled with a door and bolt assembly;
a reversible gear transmission disposed between the motor and the bolt of the door, the reversible gear transmission structured to be driven by the motor in one mode of operation to extend and retract the bolt, the reversible gear transmission also capable of receiving a movement from the user grappling member and transmitting that movement to the motor; and
wherein the gear transmission also includes a lost motion feature such that movement of the motor over a substantial range of throw of the bolt need not cause a corresponding movement in the bolt.

12. An apparatus comprising:
an auto dead bolt door device having a first side key entry and a back side having a user grappling member;
a motor disposed internal to the device capable of providing torque useful in actuating a dead bolt of the auto dead bolt door device, the dead bolt having a retracted position, a dead position opposite the retracted position, and a plurality of extended positions between the retracted position and the dead position; and a gearing system that includes a plurality of toothed members having corresponding intermeshed gear teeth disposed between the motor and the dead bolt and operable to convey torque from the motor to actuate the dead bolt, the plurality of toothed members having a cooperative configuration that permits torque to be applied to move the plurality of toothed members in a first direction and an opposite second direction such that an array of gear teeth of a first toothed member is configured to be a driven gear and a driving gear depending upon a torque applied; and a lost motion feature between the motor and the dead bolt, the lost motion feature structured to permit movement of the dead bolt between the dead position and the retracted position without corresponding motion in the motor.

13. The apparatus of claim 12, wherein the lost motion feature permits movement of the motor over a substantial range which does not cause a corresponding movement in the dead bolt.

14. An apparatus comprising:

an auto dead bolt door device having first side key entry and a back side having a user grappling member;

a motor disposed internal to the device capable of providing torque useful in actuating a dead bolt of the auto dead bolt door device, the dead bolt having a retracted position, a dead position opposite the retracted position, and a plurality of extended positions between the retracted position and the dead position; and a gearing system that includes a plurality of toothed members having Corresponding intermeshed gear teeth disposed between the motor and the dead bolt and operable to convey torque from the motor to actuate the dead bolt, wherein a first of the plurality of toothed members is coupled directly to the motor, the plurality of toothed members having a cooperative configuration that permits backdriven operation to allow torque to be applied to move the plurality of toothed members in a first direction and an opposite second direction such that an array of gear teeth of the first toothed member is configured to be a driven gear and a driving gear depending upon a torque applied, wherein the first toothed member of the gearing systems does not comprise a worm gear arrangement.

15. The apparatus of claim 14, wherein the plurality of toothed members includes a series of toothed members numbering more than two.

16. The apparatus of claim 15, wherein the plurality of toothed members include a pinion and a face gear.

17. An apparatus comprising:

a powered door access device module structured to operate a bolt that can be extended and retracted into a door jamb to secure a door, the device module also having a receptacle for receiving an energy storage device useful to provide power to a motor to extend and retract the bolt and a user grappling member useful to permit a user to extend and retract the bolt when the device module is coupled with a door and bolt assembly;

a reversible gear transmission disposed between the motor and the bolt of the door, the reversible gear transmission structured to be driven by the motor in one mode of operation to extend and retract the bolt, the reversible gear transmission also capable of receiving a movement from the user grappling member and transmitting that movement to the motor: and a lost motion coupling between the motor and the bolt, the lost motion coupling structured to permit movement of the bolt between an extended position and a retracted position without corresponding movement in the motor.

* * * * *